US012532132B2

(12) United States Patent
Qi et al.

(10) Patent No.: US 12,532,132 B2
(45) **Date of Patent: *Jan. 20, 2026**

(54) SYSTEMS AND METHODS FOR SUPPRESSING SOUND LEAKAGE

(71) Applicant: SHENZHEN SHOKZ CO., LTD., Guangdong (CN)

(72) Inventors: Xin Qi, Shenzhen (CN); Fengyun Liao, Shenzhen (CN); Jinbo Zheng, Shenzhen (CN); Qian Chen, Shenzhen (CN); Hao Chen, Shenzhen (CN); Lei Zhang, Shenzhen (CN); Junjiang Fu, Shenzhen (CN); Bingyan Yan, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 210 days.

This patent is subject to a terminal disclaimer.

(21) Appl. No.: 18/361,807

(22) Filed: Jul. 28, 2023

(65) Prior Publication Data

US 2023/0370791 A1 Nov. 16, 2023

Related U.S. Application Data

(63) Continuation-in-part of application No. 18/308,760, filed on Apr. 28, 2023, now Pat. No. 12,302,066, (Continued)

(30) Foreign Application Priority Data

Apr. 30, 2019 (CN) ......................... 201910364346.2
Sep. 19, 2019 (CN) ......................... 201910888067.6
Sep. 19, 2019 (CN) ......................... 201910888762.2

(51) Int. Cl.
*H04R 25/00* (2006.01)
*G10K 9/13* (2006.01)
(Continued)

(52) U.S. Cl.
CPC ............. *H04R 25/505* (2013.01); *G10K 9/13* (2013.01); *G10K 9/22* (2013.01); *G10K 11/175* (2013.01);
(Continued)

(58) Field of Classification Search
CPC .... H04R 25/505; H04R 1/2811; H04R 9/066; H04R 1/2876; H04R 17/00;
(Continued)

(56) References Cited

U.S. PATENT DOCUMENTS 2,075,196 A 3/1937 Hand
2,327,320 A 8/1943 Shapiro
(Continued)

FOREIGN PATENT DOCUMENTS

CN 201616895 U 10/2010
CN 201690580 U 12/2010
(Continued)

OTHER PUBLICATIONS

International Search Report in PCT/CN2020/070539 mailed on Apr. 7, 2020, 6 pages.
(Continued)

*Primary Examiner* — Tuan D Nguyen
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in a target region. The interference at a specific frequency
(Continued)

1700 relates to a distance between the at least one sound guiding hole and the portion of the housing.

20 Claims, 25 Drawing Sheets

Related U.S. Application Data which is a continuation of application No. 17/804,611, filed on May 31, 2022, now Pat. No. 11,659,341, which is a continuation of application No. 17/170,874, filed on Feb. 8, 2021, now Pat. No. 11,363,392, which is a continuation-in-part of application No. 17/074,762, filed on Oct. 20, 2020, now Pat. No. 11,197,106, which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978, said application No. 17/170,874 is a continuation-in-part of application No. 16/833,839, filed on Mar. 30, 2020, now Pat. No. 11,399,245, which is a continuation of application No. 15/752,452, filed as application No. PCT/CN2015/086907 on Aug. 13, 2015, now Pat. No. 10,609,496, application No. 18/361,807, filed on Jul. 28, 2023 is a continuation-in-part of application No. 18/337,424, filed on Jun. 19, 2023, now Pat. No. 12,238,470, which is a continuation of application No. 17/320,253, filed on May 14, 2021, now Pat. No. 11,689,837, which is a continuation of application No. PCT/CN2020/070539, filed on Jan. 6, 2020.

(51) Int. Cl.

| | |
|---|---|
| ***G10K 9/22*** | (2006.01) |
| ***G10K 11/175*** | (2006.01) |
| ***G10K 11/178*** | (2006.01) |
| ***G10K 11/26*** | (2006.01) |
| ***H04R 1/28*** | (2006.01) |
| ***H04R 9/06*** | (2006.01) |
| *H04R 17/00* | (2006.01) |

(52) U.S. Cl.
CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search
CPC ........ H04R 2460/13; G10K 9/13; G10K 9/22; G10K 11/175; G10K 11/178; G10K 11/26; G10K 2210/3216; G10K 11/17823; G10K 11/17881
See application file for complete search history.

(56) References Cited

U.S. PATENT DOCUMENTS

| | | | |
|---|---|---|---|
| 4,791,673 A | 12/1988 | Schreiber | |
| 4,987,597 A | 1/1991 | Haertl | |
| 5,280,524 A | 1/1994 | Norris | |
| 5,282,251 A | 1/1994 | Petersen | |
| 5,323,468 A | 6/1994 | Bottesch | |
| 5,430,803 A | 7/1995 | Kimura et al. | |
| 5,673,328 A | 9/1997 | Wandl et al. | |
| 5,692,059 A | 11/1997 | Kruger | |
| 5,757,935 A | 5/1998 | Kang et al. | |
| 5,790,684 A | 8/1998 | Niino et al. | |
| 6,377,697 B1 | 4/2002 | Cheng | |
| 6,456,721 B1 | 9/2002 | Fukuda | |
| 6,478,108 B1 | 11/2002 | Linhard et al. | |
| 6,668,065 B2 | 12/2003 | Lee et al. | |
| 6,850,138 B1 | 2/2005 | Sakai | |
| 7,400,738 B2 | 7/2008 | Niederdränk et al. | |
| 7,639,825 B2 | 12/2009 | Fukuda | |
| 7,822,215 B2 | 10/2010 | Carazo et al. | |
| 8,141,678 B2 | 3/2012 | Ikeyama et al. | |
| 8,325,964 B2 | 12/2012 | Weisman | |
| 8,340,334 B2 | 12/2012 | Suyama | |
| 8,345,915 B2 | 1/2013 | Shin et al. | |
| 8,433,082 B2 | 4/2013 | Abolfathi | |
| 8,447,061 B2 | 5/2013 | Lee | |
| 8,520,867 B2 | 8/2013 | Koike et al. | |
| 8,526,641 B2 | 9/2013 | Parker et al. | |
| 8,553,910 B1 | 10/2013 | Dong et al. | |
| 8,660,278 B2 | 2/2014 | Abolfathi et al. | |
| 8,699,742 B2 | 4/2014 | Heiman et al. | |
| 8,737,649 B2 | 5/2014 | Parker et al. | |
| 8,908,891 B2 | 12/2014 | Mersky | |
| 9,226,075 B2 | 12/2015 | Lee | |
| 9,253,563 B2 | 2/2016 | Fukuda | |
| 9,729,978 B2 | 8/2017 | Qi et al. | |
| 10,149,071 B2 | 12/2018 | Qi et al. | |
| 10,334,372 B2 | 6/2019 | Qi et al. | |
| 10,506,362 B1 | 12/2019 | Gomes | |
| 10,616,696 B2 | 4/2020 | Qi et al. | |
| 10,631,075 B1 | 4/2020 | Patil et al. | |
| 10,897,677 B2 | 1/2021 | Walraevens et al. | |
| 11,140,497 B2 | 10/2021 | Liao et al. | |
| 11,197,106 B2 | 12/2021 | Qi et al. | |
| 11,323,830 B2 | 5/2022 | Liao et al. | |
| 11,323,832 B2 | 5/2022 | Liao et al. | |
| 11,343,623 B2 | 5/2022 | Liao et al. | |
| 11,343,624 B2 | 5/2022 | Liao et al. | |
| 11,343,625 B2 | 5/2022 | Liao et al. | |
| 11,368,800 B2 | 6/2022 | Qi et al. | |
| 11,399,245 B2 | 7/2022 | Liao et al. | |
| 11,438,717 B2 | 9/2022 | Liao et al. | |
| 11,570,560 B2 | 1/2023 | Liao et al. | |
| 11,582,563 B2 | 2/2023 | Qi et al. | |
| 11,611,837 B2 | 3/2023 | Liao et al. | |
| 2003/0012395 A1 | 1/2003 | Fukuda | |
| 2003/0048913 A1 | 3/2003 | Lee et al. | |
| 2004/0105566 A1 | 6/2004 | Matsunaga et al. | |
| 2004/0131219 A1 | 7/2004 | Polk, Jr. | |
| 2005/0251952 A1 | 11/2005 | Johnson | |
| 2005/0254672 A1 | 11/2005 | Kobayashi | |
| 2006/0098829 A1 | 5/2006 | Kobayashi | |
| 2006/0140435 A1 | 6/2006 | Sheehy et al. | |
| 2006/0165246 A1 | 7/2006 | Lee et al. | |
| 2006/0262954 A1 | 11/2006 | Lee et al. | |
| 2007/0034493 A1 | 2/2007 | Kawasaki et al. | |
| 2007/0041595 A1 | 2/2007 | Carazo et al. | |
| 2007/0053536 A1 | 3/2007 | Westerkull | |
| 2007/0053542 A1 | 3/2007 | Lee | |
| 2007/0237341 A1 | 10/2007 | Laroche | |
| 2008/0107300 A1 | 5/2008 | Chen | |
| 2008/0144874 A1 | 6/2008 | Wu et al. | |
| 2009/0095613 A1 | 4/2009 | Lin | |
| 2009/0103768 A1 | 4/2009 | Lin | |
| 2009/0127020 A1 | 5/2009 | Connor | |
| 2009/0147981 A1* | 6/2009 | Blanchard | H04R 1/1075 381/380 |
| 2009/0208031 A1 | 8/2009 | Abolfathi | |
| 2009/0209806 A1 | 8/2009 | Hakansson | |
| 2009/0245553 A1 | 10/2009 | Parker | |
| 2009/0285417 A1 | 11/2009 | Shin et al. | |
| 2009/0290730 A1 | 11/2009 | Fukuda et al. | |
| 2010/0054492 A1 | 3/2010 | Eaton et al. | |

(56) References Cited

U.S. PATENT DOCUMENTS

| | | | |
|---|---|---|---|
| 2010/0080400 A1* | 4/2010 | Sibbald | H04R 3/002 381/71.6 |
| 2010/0322454 A1 | 12/2010 | Ambrose et al. | |
| 2010/0329485 A1 | 12/2010 | Fukuda | |
| 2011/0150262 A1 | 6/2011 | Nakama et al. | |
| 2012/0020501 A1 | 1/2012 | Lee | |
| 2012/0070022 A1 | 3/2012 | Saiki | |
| 2012/0177206 A1 | 7/2012 | Yamagishi et al. | |
| 2012/0201406 A1 | 8/2012 | Yamaguchi | |
| 2013/0051585 A1 | 2/2013 | Karkkainen et al. | |
| 2013/0163791 A1 | 6/2013 | Qi et al. | |
| 2013/0188803 A1 | 7/2013 | Shaanan et al. | |
| 2013/0259271 A1 | 10/2013 | Miyoshi et al. | |
| 2013/0329919 A1 | 12/2013 | He | |
| 2014/0009008 A1 | 1/2014 | Li et al. | |
| 2014/0064533 A1 | 3/2014 | Kasic, II | |
| 2014/0185822 A1 | 7/2014 | Kunimoto et al. | |
| 2014/0185837 A1 | 7/2014 | Kunimoto et al. | |
| 2014/0274229 A1 | 9/2014 | Fukuda | |
| 2014/0315605 A1 | 10/2014 | Cho et al. | |
| 2014/0355777 A1 | 12/2014 | Nabata et al. | |
| 2015/0030189 A1 | 1/2015 | Nabata et al. | |
| 2015/0195664 A1 | 7/2015 | Lin et al. | |
| 2015/0208183 A1 | 7/2015 | Bern | |
| 2015/0256656 A1 | 9/2015 | Horii | |
| 2015/0264473 A1 | 9/2015 | Fukuda | |
| 2015/0268673 A1 | 9/2015 | Farzbod et al. | |
| 2015/0326967 A1 | 11/2015 | Otani | |
| 2016/0037243 A1 | 2/2016 | Lippert et al. | |
| 2016/0127841 A1 | 5/2016 | Horii | |
| 2016/0150337 A1 | 5/2016 | Nandy | |
| 2016/0165357 A1 | 6/2016 | Morishita et al. | |
| 2016/0295328 A1 | 10/2016 | Park | |
| 2016/0329041 A1 | 11/2016 | Qi et al. | |
| 2017/0201823 A1 | 7/2017 | Shetye et al. | |
| 2017/0223445 A1 | 8/2017 | Bullen et al. | |
| 2018/0167710 A1 | 6/2018 | Silver et al. | |
| 2018/0182370 A1 | 6/2018 | Hyde et al. | |
| 2018/0376231 A1 | 12/2018 | Pfaffinger | |
| 2019/0014425 A1 | 1/2019 | Liao et al. | |
| 2019/0052954 A1 | 2/2019 | Rusconi Clerici Beltrami et al. | |
| 2019/0104352 A1 | 4/2019 | Ozawa et al. | |
| 2019/0238971 A1 | 8/2019 | Wakeland et al. | |
| 2019/0320258 A1 | 10/2019 | Ohura | |
| 2020/0228904 A1 | 7/2020 | Liao et al. | |
| 2020/0367008 A1 | 11/2020 | Walsh et al. | |
| 2021/0099027 A1 | 4/2021 | Larsson et al. | |
| 2021/0219059 A1 | 7/2021 | Qi et al. | |
| 2021/0258696 A1 | 8/2021 | Qi et al. | |
| 2022/0240029 A1 | 7/2022 | Liao et al. | |
| 2024/0276155 A1 | 8/2024 | Li et al. | |

FOREIGN PATENT DOCUMENTS

| | | | |
|---|---|---|---|
| CN | 102014328 | A | 4/2011 |
| CN | 102421043 | A | 4/2012 |
| CN | 202435600 | U | 9/2012 |
| CN | 103167390 | A | 6/2013 |
| CN | 103347235 | A | 10/2013 |
| CN | 204206450 | U | 3/2015 |
| CN | 105007551 | A | 10/2015 |
| CN | 105101019 | A | 11/2015 |
| CN | 105101020 | A | 11/2015 |
| CN | 105142077 | A | 12/2015 |
| CN | 204887455 | U | 12/2015 |
| CN | 205142506 | U | 4/2016 |
| CN | 106303779 | A | 1/2017 |
| CN | 206865707 | U | 1/2018 |
| CN | 109547888 | A | 3/2019 |
| CN | 209330353 | U | 8/2019 |
| EP | 1261232 | A1 | 11/2002 |
| EP | 1404146 | A1 | 3/2004 |
| EP | 1603362 | A1 | 12/2005 |
| EP | 2779684 | A1 | 9/2014 |
| EP | 2011367 | B1 | 12/2014 |
| JP | S5574290 | A | 6/1980 |
| JP | 07007797 | A | 1/1995 |
| JP | 2003264882 | A | 9/2003 |
| JP | 2004064457 | A | 2/2004 |
| JP | 2004158961 | A | 6/2004 |
| JP | 2005151183 | A | 6/2005 |
| JP | 2006025333 | A | 1/2006 |
| JP | 2006332715 | A | 12/2006 |
| JP | 2007129384 | A | 5/2007 |
| JP | 2007251358 | A | 9/2007 |
| JP | 2008017398 | A | 1/2008 |
| JP | 2011160175 | A | 8/2011 |
| JP | 2013055571 | A | 3/2013 |
| JP | 2013243564 | A | 12/2013 |
| JP | 2014072555 | A | 4/2014 |
| KR | 20010111653 | A | 12/2001 |
| KR | 20050030183 | A | 3/2005 |
| KR | 20070122104 | A | 12/2007 |
| KR | 20090082999 | A | 8/2009 |
| KR | 20110037483 | A | 4/2011 |
| KR | 200476572 | Y1 | 3/2015 |
| WO | 2004095878 | A2 | 11/2004 |
| WO | 2006088410 | A1 | 8/2006 |
| WO | 2007034739 | A1 | 3/2007 |
| WO | 2021133679 | A1 | 7/2021 |

OTHER PUBLICATIONS

Written Opinion in PCT/CN2020/070539 mailed on Apr. 7, 2020, 7 pages.

Decision of Patent Grant in Korean Application No. 10-2016-7017110 mailed on Jun. 14, 2018, 3 pages.

International Search Report in PCT/CN2014/094065 mailed on Mar. 17, 2015, 5 pages.

First Office Action in Chinese application No. 201410005804.0 mailed on Dec. 17, 2015, 10 pages.

Communication Pursuant to Article 94(3) EPC in European Application No. 14877111.6 mailed on Apr. 23, 2018, 6 pages.

Notice of Reasons for Rejection in Japanese Application No. 2016-545828 mailed on Oct. 10, 2017, 6 pages.

Decision to Grant a Patent in Japanese Application No. 2016-545828 mailed on Jan. 16, 2018, 5 pages.

The Extended European Search Report in European Application No. 14877111.6 mailed on Mar. 17, 2017, 6 pages.

First Examination Report in Indian Application No. 201617026062 mailed on Nov. 13, 2020, 6 pages.

Written Opinion in PCT/CN2014/094065 mailed on Mar. 17, 2015, 10 pages.

International Search Report in PCT/CN2015/086907 mailed on May 6, 2016, 12 pages.

The Extended European Search Report in European Application No. 15900793.9 mailed on May 17, 2018, 9 pages.

Communication Pursuant to Article 94(3) EPC in European Application No. 15900793.9 mailed on Apr. 10, 2019, 6 pages.

Notice of Reasons for Rejection in Japanese Application No. 2018146019 mailed on Jul. 23, 2019, 10 pages.

Notice of Reasons for Rejection in Japanese Application No. 2018146021 mailed on Jul. 30, 2019, 11 pages.

Notice of Reasons for Rejection in Japanese Application No. 2018-506985 mailed on Sep. 3, 2019, 10 pages.

Decision of Final Rejection in Japanese Application No. 2018-146019 mailed on Jan. 21, 2020, 9 pages.

Communication Pursuant to Article 94(3) EPC in European Application No. 15900793.9 mailed on Apr. 28, 2020, 9 pages.

Decision to Grant a Patent in Japanese Application No. 2018-146021 mailed on Jul. 21, 2020, 6 pages.

Notice of Reasons for Rejection in Japanese Application No. 2020-088413 mailed on Aug. 3, 2021, 7 pages.

M. Gripper et al., Using the Callsign Acquisition Test (CAT) to Compare the Speech Intelligibility of Air Versus Bone Conduction, International Journal of Industrial Ergonomics, 37(7): 631-641, 2007.

(56) References Cited

OTHER PUBLICATIONS

Martin L. Lenhardt et al., Measurement of Bone Conduction Levels for High Frequencies, International Tinnitus Journal, 8(1): 9-12, 2002.
The Extended European Search Report in European Application No. 21186537.3 mailed on Nov. 9, 2021, 9 pages.
Notice of Preliminary Rejection in Korean Application No. 10-2022-7003237 mailed on Apr. 13, 2022, 14 pages.
Notice of Reasons for Rejection in Japanese Application No. 2020-088413 mailed on Sep. 6, 2022, 11 pages.
Notice of Reasons for Rejection in Japanese Application No. 2021-179711 mailed on Oct. 18, 2022, 9 pages.
Notice of Preliminary Rejection in Korean Application No. 10-2022-7003237 mailed on Oct. 11, 2022, 14 pages.
Office Action in Brazilian Application No. 112018002854-1 mailed on Feb. 24, 2023, 8 pages.
Paula Henry et al., Bone Conduction: Anatomy, Physiology, and Communication, Army Research Laboratory, 2007, 206 pages.
Notice of Reasons for Rejection in Japanese Application No. 2020088413 mailed on Apr. 4, 2023, 8 pages.
The Extended European Search Report in European Application No. 24223173.6 mailed on Apr. 30, 2025, 10 pages.

* cited by examiner

1700

1900

2000

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 18/308,760, filed on Apr. 28, 2023, which is a continuation of U.S. patent application Ser. No. 17/804,611 (now U.S. Pat. No. 11,659,341), filed on May 31, 2022, which is a continuation of U.S. patent application Ser. No. 17/170,874 (now U.S. Pat. No. 11,363, 392), filed on Feb. 8, 2021, which is a continuation-in-part application of U.S. patent application Ser. No. 17/074,762 (now U.S. Pat. No. 11,197,106), filed on Oct. 20, 2020, which is a continuation-in-part of U.S. patent application Ser. No. 16/813,915 (now U.S. Pat. No. 10,848,878), filed on Mar. 10, 2020, which is a continuation of U.S. patent application Ser. No. 16/419,049 (issued as U.S. Pat. No. 10,616,696), filed on May 22, 2019, which is a continuation of U.S. patent application Ser. No. 16/180,020 (issued as U.S. Pat. No. 10,334,372), filed on Nov. 5, 2018, which is a continuation of U.S. patent application Ser. No. 15/650,909 (issued as U.S. Pat. No. 10,149,071), filed on Jul. 16, 2017, which is a continuation of U.S. patent application Ser. No. 15/109,831 (issued as U.S. Pat. No. 9,729,978), filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; U.S. patent application Ser. No. 17/170,874 is also a continuation-in-part application of U.S. patent application Ser. No. 16/833,839 (now U.S. Pat. No. 11,399,245), filed on Mar. 30, 2020, which is a continuation of U.S. application Ser. No. 15/752,452 (issued as U.S. Pat. No. 10,609,496), filed on Feb. 13, 2018, which is a national stage entry under 35 U.S.C. § 371 of International Application No. PCT/CN2015/086907, filed on Aug. 13, 2015, the entire contents of each of which are hereby incorporated by reference; the present application is also a continuation-in-part of U.S. application Ser. No. 18/337,424, filed on Jun. 19, 2023, which is a continuation of U.S. application Ser. No. 17/320,253 (now U.S. Pat. No. 11,689,837), filed on May 14, 2021, which a Continuation of International Patent Application No. PCT/CN2020/070539, filed on Jan. 6, 2020, which claims priority to Chinese Patent Application No. 201910364346.2 filed on Apr. 30, 2019, and Chinese Patent Application No. 201910888762.2 filed on Sep. 19, 2019, and Chinese Patent Application No. 201910888067.6 filed on Sep. 19, 2019, the contents of each of which are hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a panel 121, a transducer 122, and a linking component 123. The transducer 122 may transduce electrical signals to mechanical vibrations. The panel 121 may be connected to the transducer 122 and vibrate synchronically with the transducer 122. The panel 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the panel 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including:

providing a bone conduction speaker including a panel fitting human skin and passing vibrations, a transducer, and a housing, wherein at least one sound guiding hole is located in at least one portion of the housing;

the transducer drives the panel to vibrate;

the housing vibrates, along with the vibrations of the transducer, and pushes air, forming a leaked sound wave transmitted in the air;

the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a panel and a transducer, wherein:

the transducer is configured to generate vibrations and is located inside the housing;

the panel is configured to be in contact with skin and pass vibrations;

At least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

THE MEANINGS OF THE MARK NUMBERS IN THE FIGURES ARE AS FOLLOWED

110, open housing; 121, panel; 122, transducer; 123, linking component; 210, first frame; 220, second frame; 230, moving coil; 240, inner magnetic component; 250, outer magnetic component; 260; panel; 270, vibration unit; 10, housing; 11, sidewall; 12, bottom; 21, panel; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
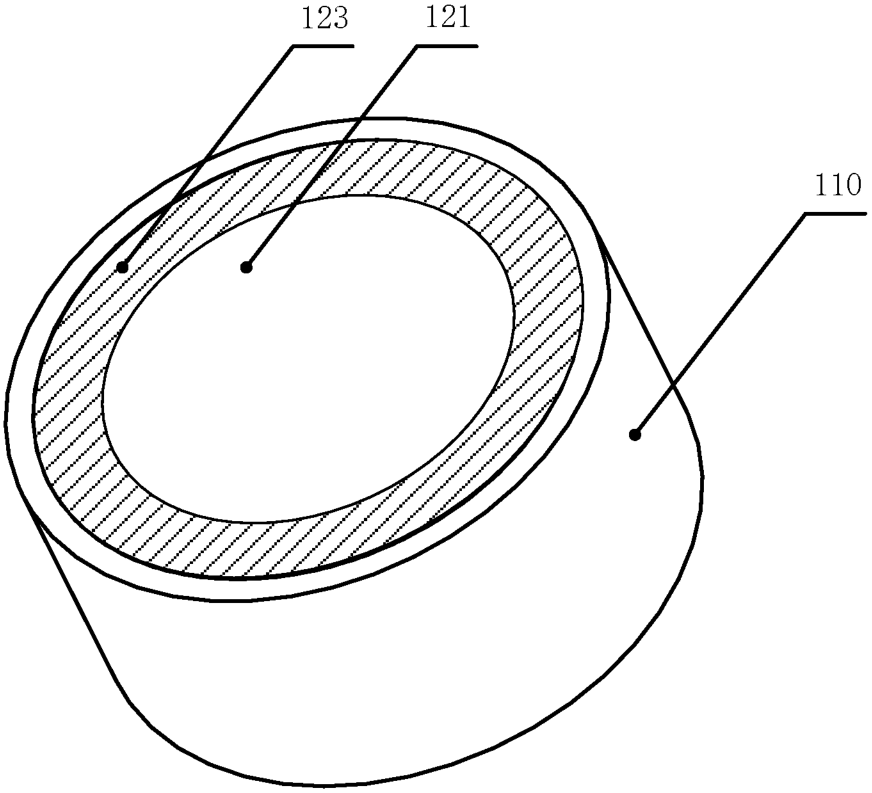
FIGS. 1A and 1B are schematic structures illustrating a bone conduction speaker of prior art.
Figure 1B:
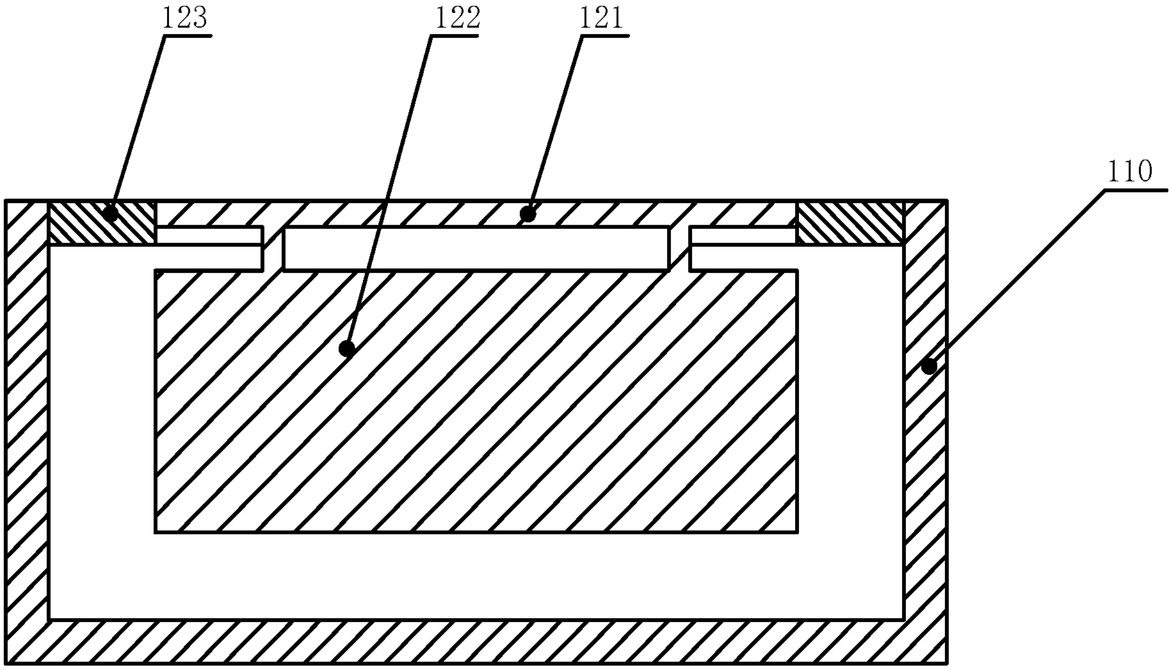
Figure 2:
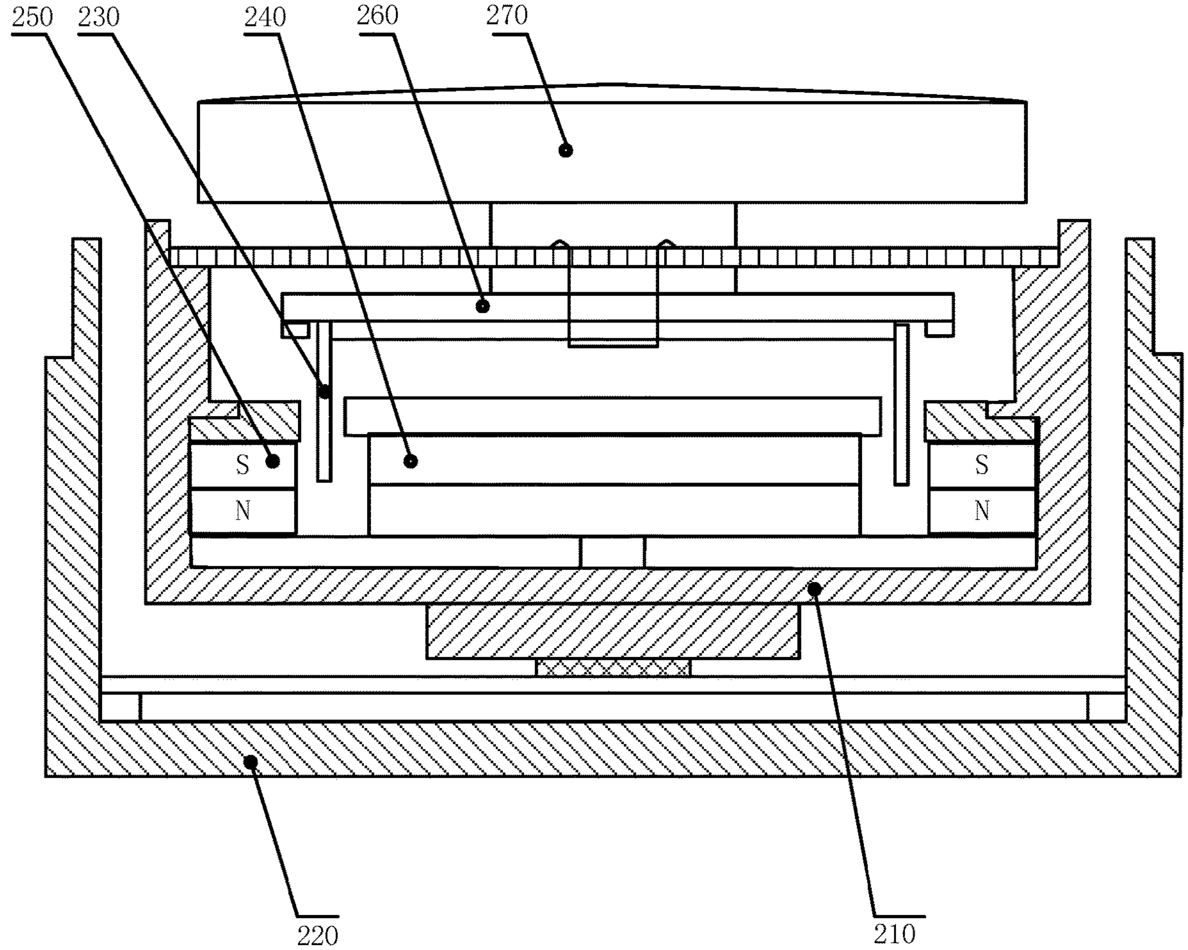
FIG. 2 is a schematic structure illustrating another bone conduction speaker of prior art.
Figure 3:
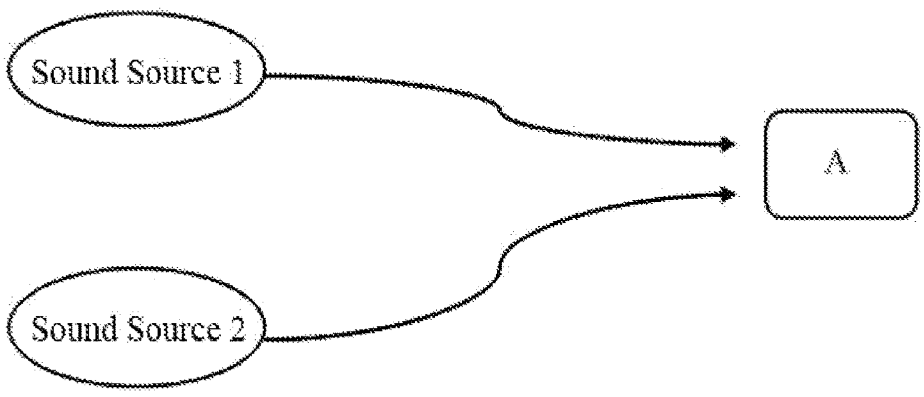
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
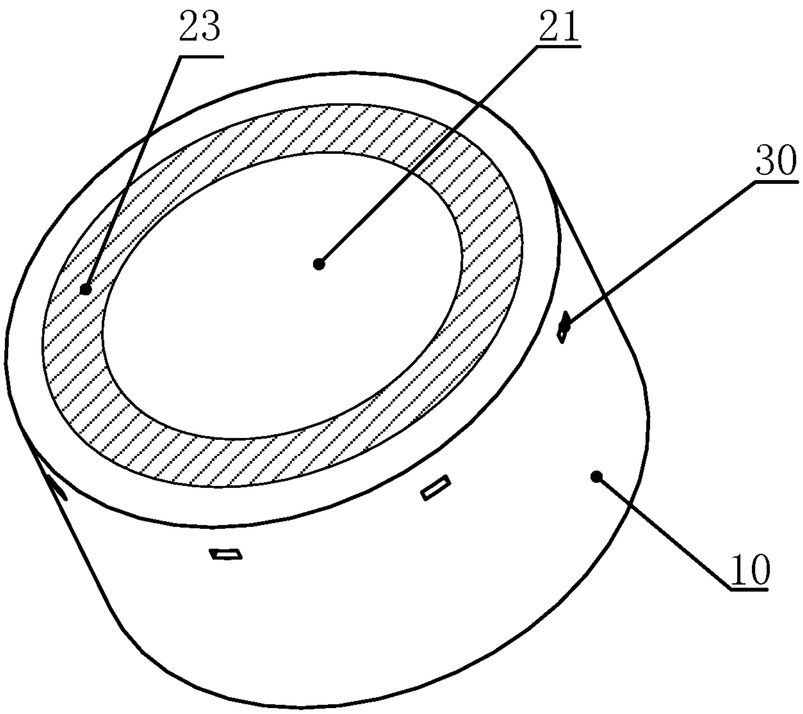
FIGS. 4A and 4B are schematic structures of an exemplary bone conduction speaker according to some embodiments of the present disclosure.
Figure 4B:
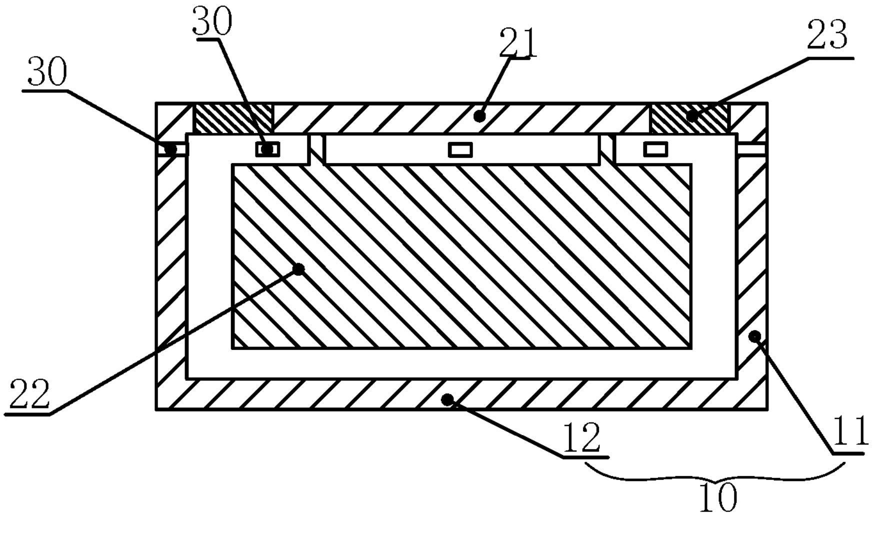

FIGS. 4A and 4B are schematic structures of an exemplary bone conduction speaker. The bone conduction speaker may include a housing 10, a panel 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the panel 21 may be connected to the transducer 22 and configured to vibrate along with the transducer 22. The panel 21 may stretch out from the opening of the housing 10, and touch the skin of the user and pass vibrations to auditory nerves through human tissues and bones, which in turn enables the user to hear sound. In some embodiments, the panel 21 may be in contact with human skin directly, or through a vibration transfer layer made of specific materials (e.g., low-density materials). The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the panel 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the panel 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the panel 21) to about the ⅓ height of the sidewall.

Figure 4C:
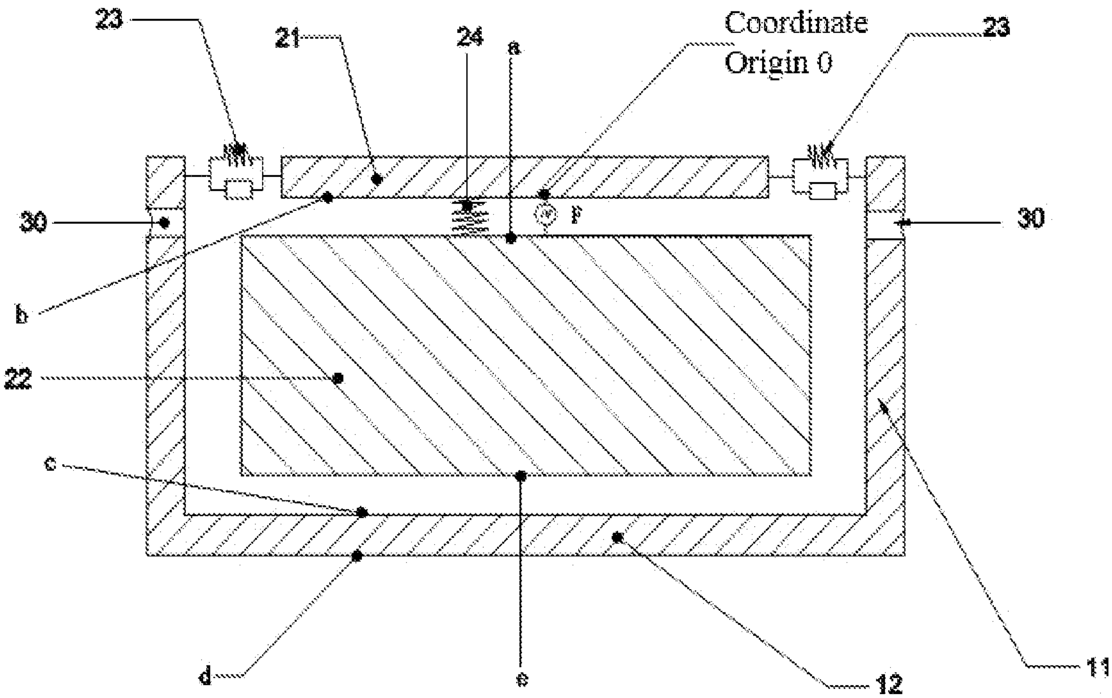
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the panel 21 may be represented by an elastic element 23 and a damping element in the parallel connection. The linking relationship between the panel 21 and the transducer 22 may be represented by an elastic element 24.

Outside the housing 10, the sound leakage reduction is proportional to $$\left(\iint_{S_{hole}} P\,ds - \iint_{S_{housing}} P_d\,ds\right) \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $P=P_a+P_b+P_c+P_e$, (2) wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the panel 21, side b refers to the lower surface of the panel 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x_a', y_a') \cdot \frac{e^{jkR(x_a', y_a')}}{4\pi R(x_a', y_a')} dx_a' dy_a' - P_{aR}, \tag{3}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR}, \tag{4}$$

$$P_c(x, y, z) = -j\omega\rho_0 \iint_{S_c} W_c(x_c', y_c') \cdot \frac{e^{jkR(x_c', y_c')}}{4\pi R(x_c', y_c')} dx_c' dy_c' - P_{cR}, \tag{5}$$

$$P_e(x, y, z) = -j\omega\rho_0 \iint_{S_e} W_e(x_e', y_e') \cdot \frac{e^{jkR(x_e', y_e')}}{4\pi R(x_e', y_e')} dx_e' dy_e' - P_{eR}, \tag{6}$$

wherein $R(x', y')=\sqrt{(x-x')^2+(y-y')^2+z^2}$ is the distance between an observation point (x, y, z) and a point on side b(x', y', 0); $S_a$, $S_b$, $S_c$ and $S_e$ are the areas of side a, side b, side c and side e, respectively;

$R(x'_a, y'_a)=\sqrt{(x-x_a')^2+(y-{}_ya')^2+(z-z_a)^2}$ is the distance between the observation point (x, y, z) and a point on side a $(x'_a, y'_a, z_a)$;

$R(x'_c, y'_c)=\sqrt{(x-x_c')^2+(y-y_c')^2+(z-z_c)^2}$ is the distance between the observation point (x, y, z) and a point on side c $(x'_c, y'_c, z_c)$;

$R(x'_e, y'_e)=\sqrt{(x-x_e')^2+(y-y_e')^2+(z-z_e)^2}$ is the distance between the observation point (x, y, z) and a point on side e $(x'_e, y'_e, z_e)$;

$k=\omega/u$ (u is the velocity of sound) is wave number, $\rho_0$ is an air density, $\omega$ is an angular frequency of vibration;

$P_{ar}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta, \tag{7}$$

$$P_{bR} = A \cdot \frac{z_b \cdot r + j\omega \cdot z_b \cdot r'}{\varphi} + \delta, \tag{8}$$

$$P_{cR} = A \cdot \frac{z_c \cdot r + j\omega \cdot z_c \cdot r'}{\varphi} + \delta, \tag{9}$$

$$P_{eR} = A \cdot \frac{z_e \cdot r + j\omega \cdot z_e \cdot r'}{\varphi} + \delta, \tag{10}$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e=F_a=F-k_1\cos\omega t-\iint S_a W_a(x,y)\mathrm{dxdy}-\iint W_e(x,y)\mathrm{dxdy}-f\quad F_b=-F+k_1\cos\omega t+\iint S_b W_b(x,y)\mathrm{dxdy}-\iint S_e W_e(x,y)\mathrm{dxdy}-L\quad F_c=F_d=F_b-k_2\cos\omega t-\iint S_c W_c(x,y)\mathrm{dxdy}-f-\gamma\quad F_d=F_b-k_2\cos\omega t-\iint S_d W_d(x,y)\mathrm{dxdy}$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and $f=\eta(dv/dy)$.

L is the equivalent load on human face when the panel acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing);

The sound pressure of an arbitrary point outside the housing, generated by the vibration of the housing 10 is expressed as:

$$P_d = -j\omega\rho_0 \int\int W_d(x_d', y_d') \cdot \frac{e^{jkR(x_d', y_d')}}{4\pi R(x_d', y_d')} dx_d' dy_d', \tag{12}$$

wherein $R(x'_d, y'_d)=\sqrt{(x-x_d')^2+(y-y_d')^2+(z-z_d)^2}$ is the distance between the observation point (x, y, z) and a point on side d $(x'_d, y'_d, z_d)$.

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}} Pds$.

In the meanwhile, because the panel 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d ds$.

The leaked sound wave and the guided sound wave interference may result in a weakened sound wave, i.e., to make $\iint_{S_{hole}} Pds$ and $\iint_{S_{housing}} P_d ds$ have the same value but opposite directions, and the sound leakage may be reduced. In some embodiments, $\iint_{S_{hole}} Pds$ may be adjusted to reduce the sound leakage. Since $\iint_{S_{hole}} Pds$ corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

Additionally, because of the basic structure and function differences of a bone conduction speaker and a traditional air conduction speaker, the formulas above are only suitable for bone conduction speakers. Whereas in traditional air conduction speakers, the air in the air housing can be treated as a whole, which is not sensitive to positions, and this is different intrinsically with a bone conduction speaker, therefore the above formulas are not suitable to an air conduction speaker.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
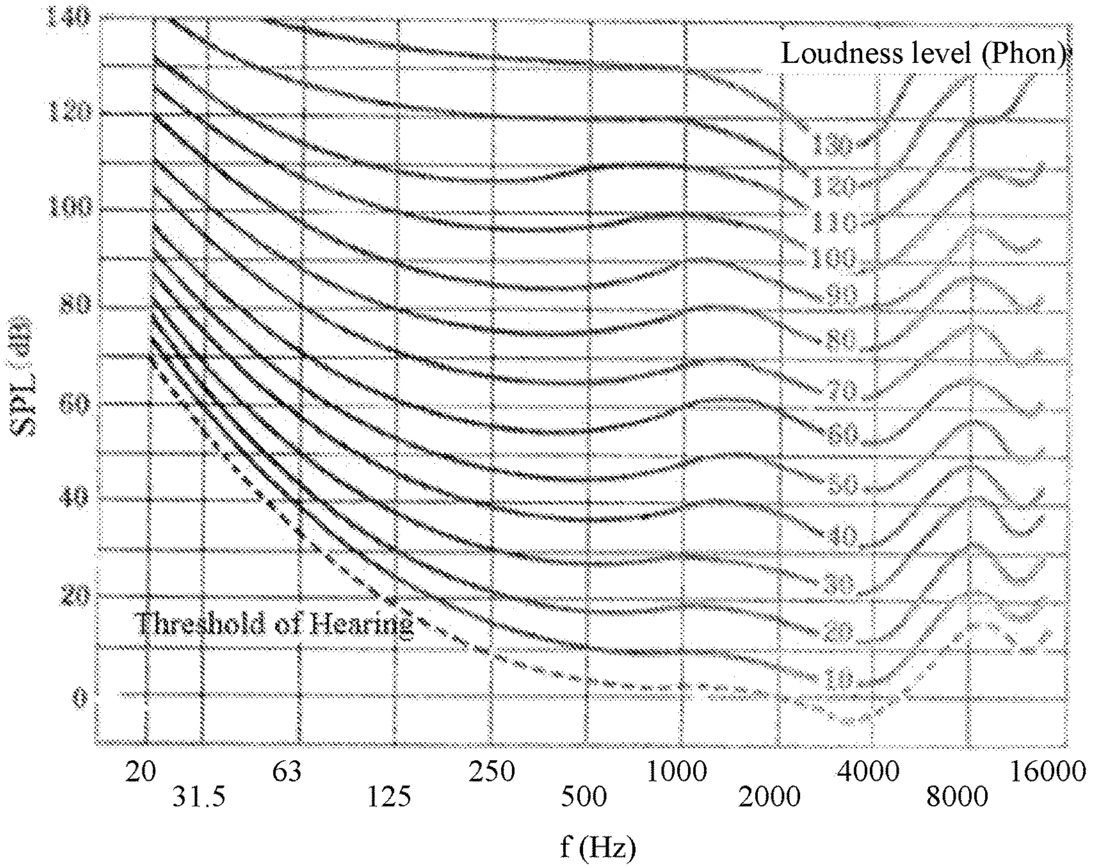
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
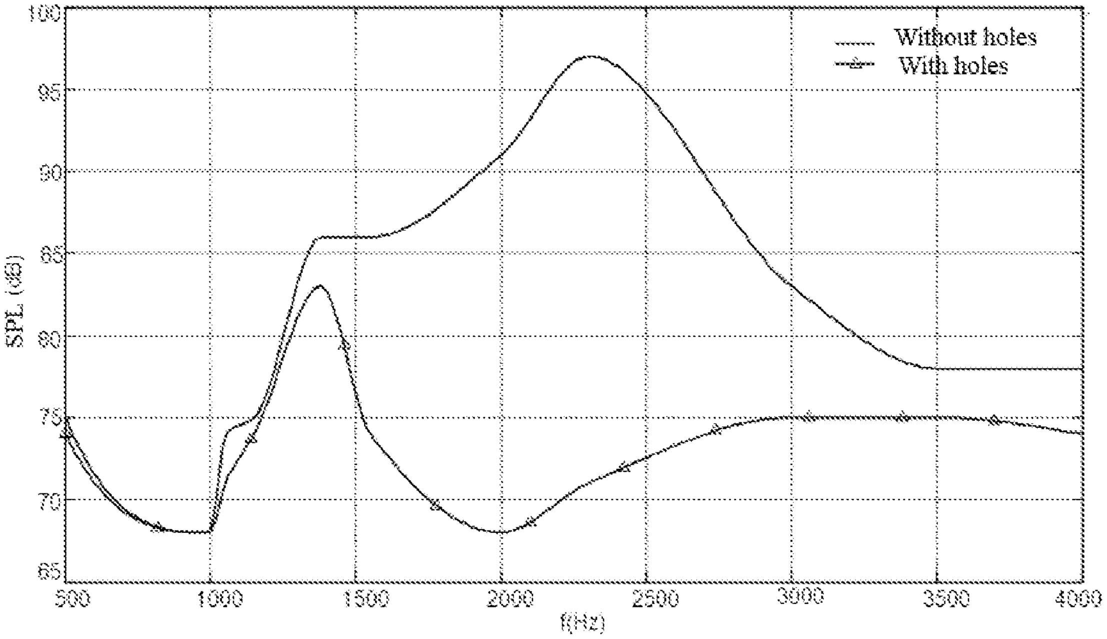
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz—2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
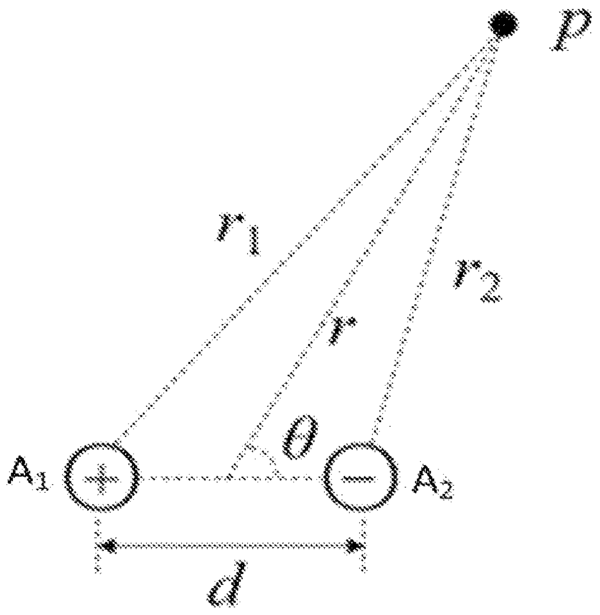
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure ρ generated by a single point sound source may satisfy Equation (13):

$$p = \frac{j\omega\rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
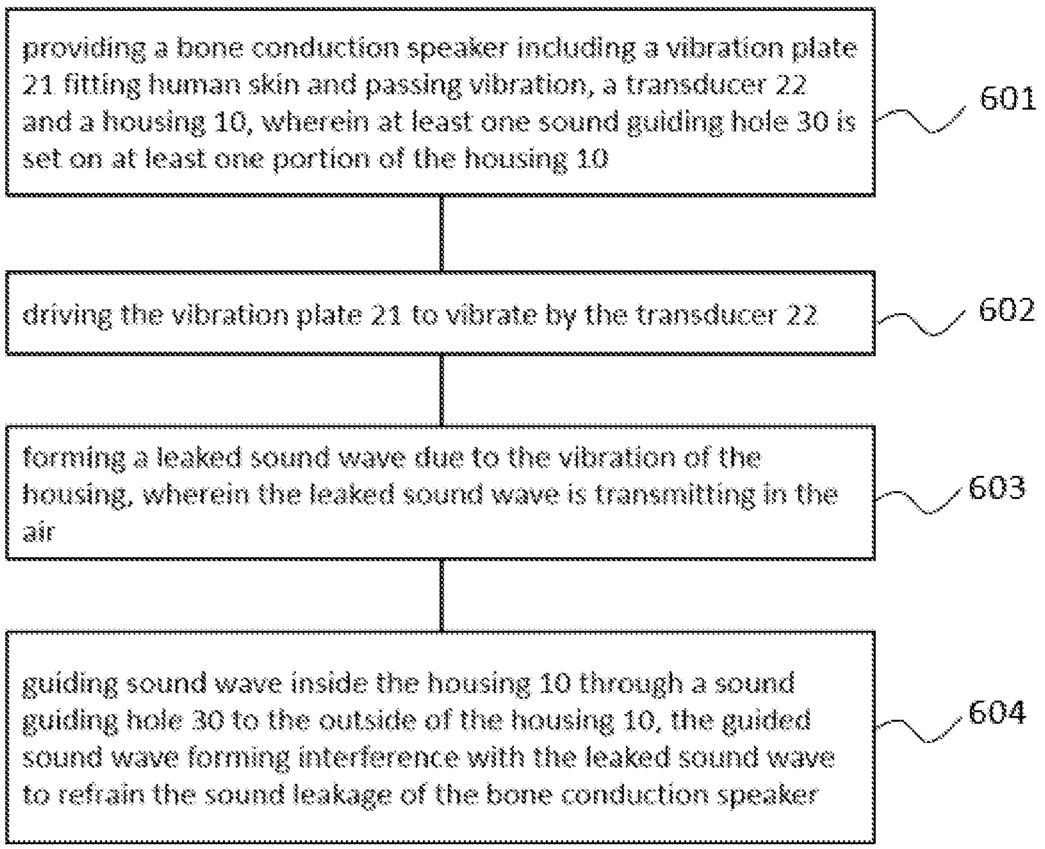
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a panel 21 touching human skin and passing vibrations, a transducer 22, and a housing 10 is provided. At least one sound guiding hole 30 is arranged on the housing 10. At 602, the panel 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
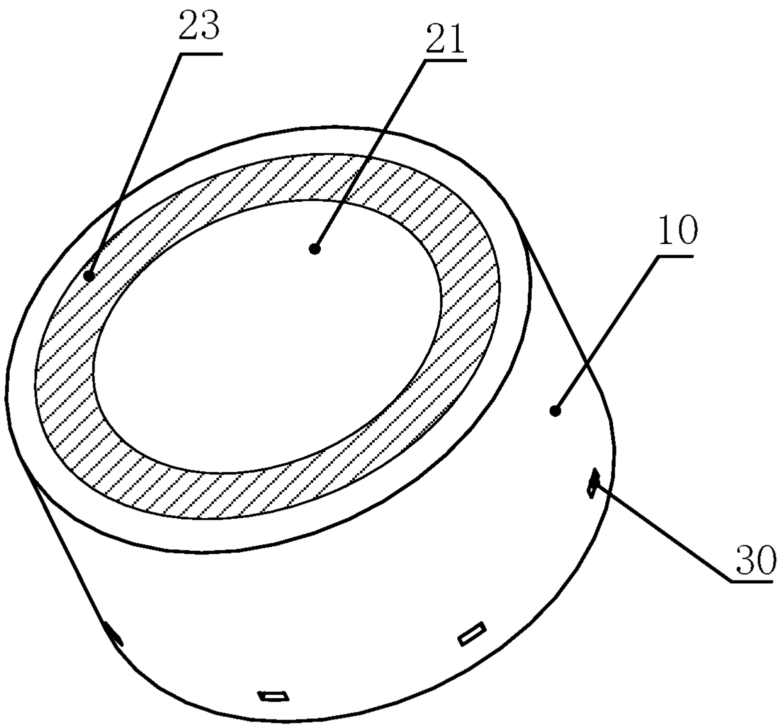
FIGS. 7A and 7B are schematic structures of an exemplary bone conduction speaker according to some embodiments of the present disclosure.
Figure 7B:
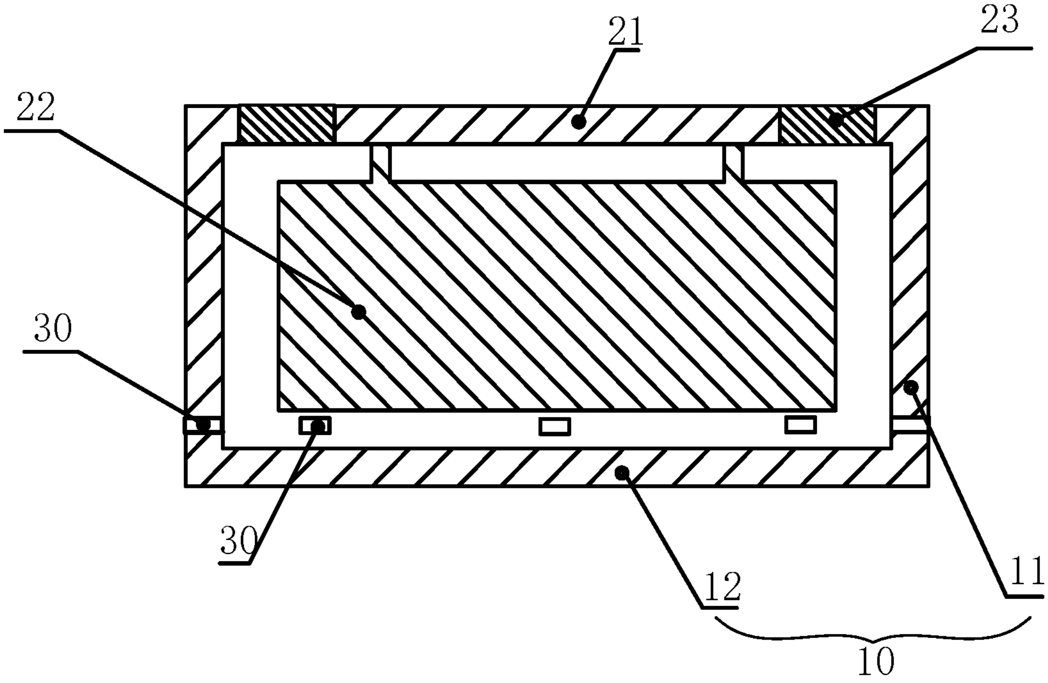

FIGS. 7A and 7B are schematic structures illustrating an exemplary bone conduction speaker according to some embodiments of the present disclosure. The bone conduction speaker may include an open housing 10, a panel 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer 22 may include components such as magnetizer, voice coil, and etc., and the components may be located inside the housing and may generate synchronous vibrations with a same frequency.

Figure 7C:
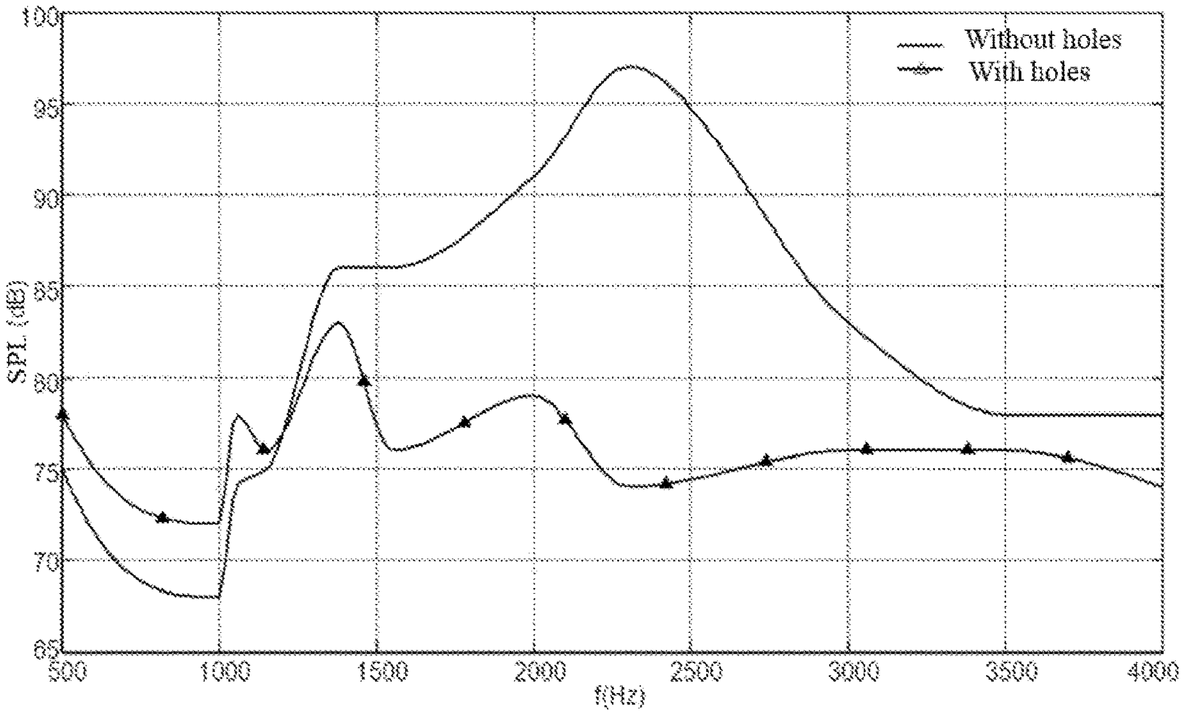
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz-4000 Hz, the sound leakage is reduced by more than 5 dB, and in the frequency range of 2250 Hz-2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
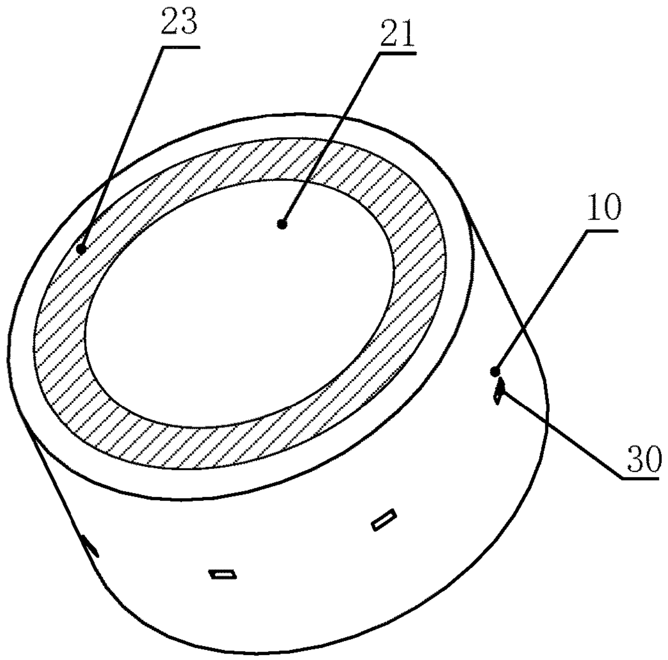
FIGS. 8A and 8B are schematic structure of an exemplary bone conduction speaker according to some embodiments of the present disclosure.
Figure 8B:
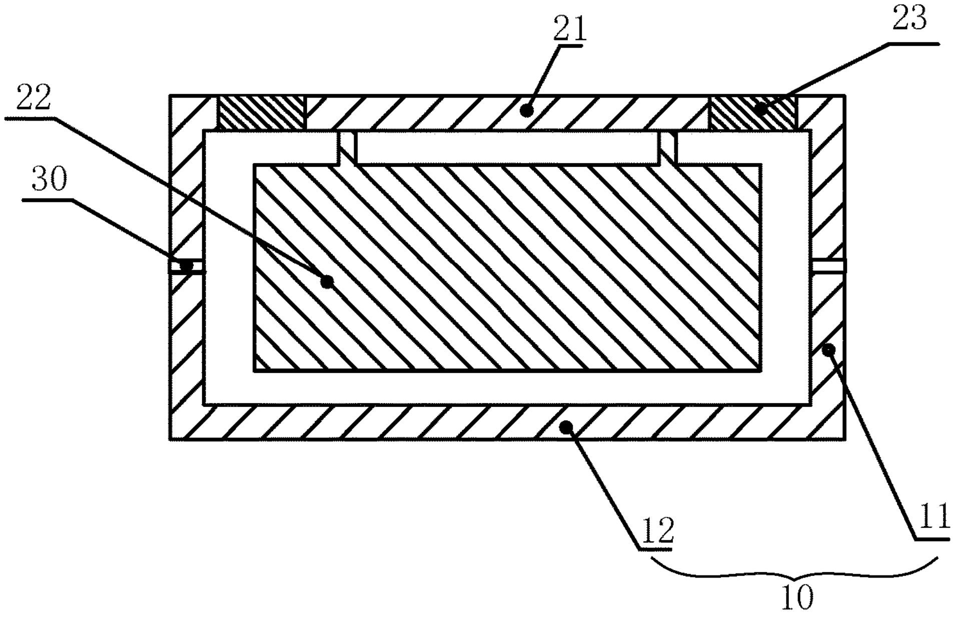

FIGS. 8A and 8B are schematic structures illustrating an exemplary bone conduction speaker according to some embodiments of the present disclosure. The bone conduction speaker may include an open housing 10, a panel 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
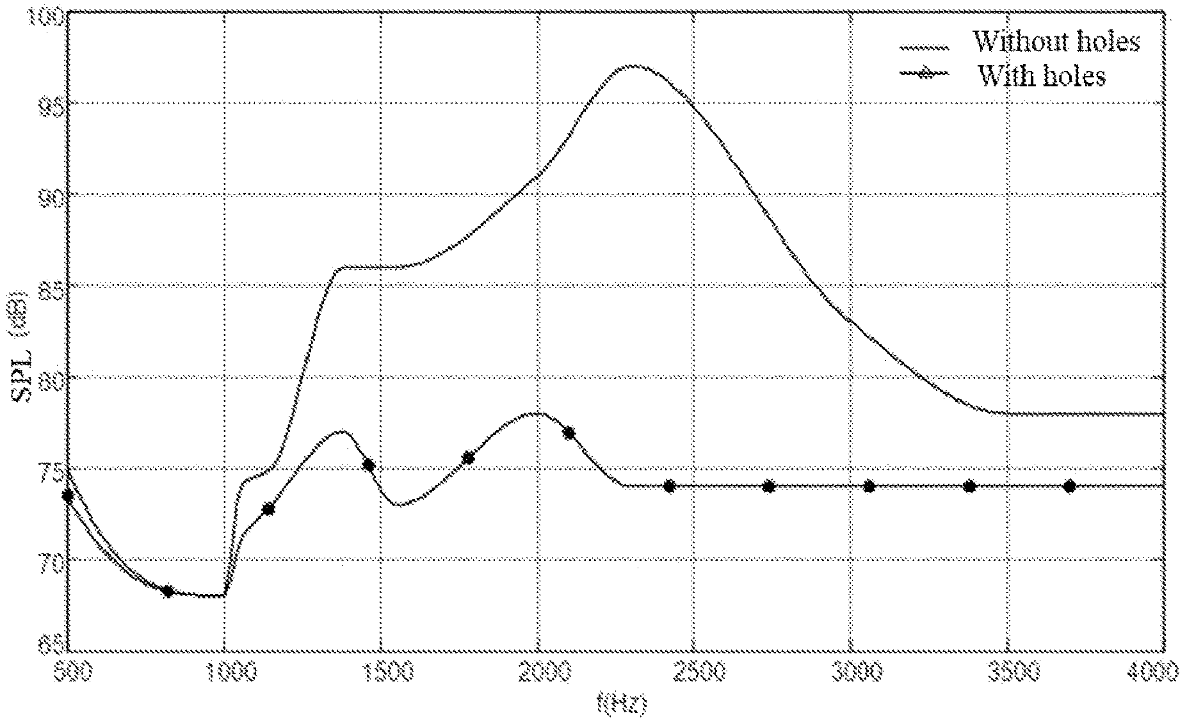
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
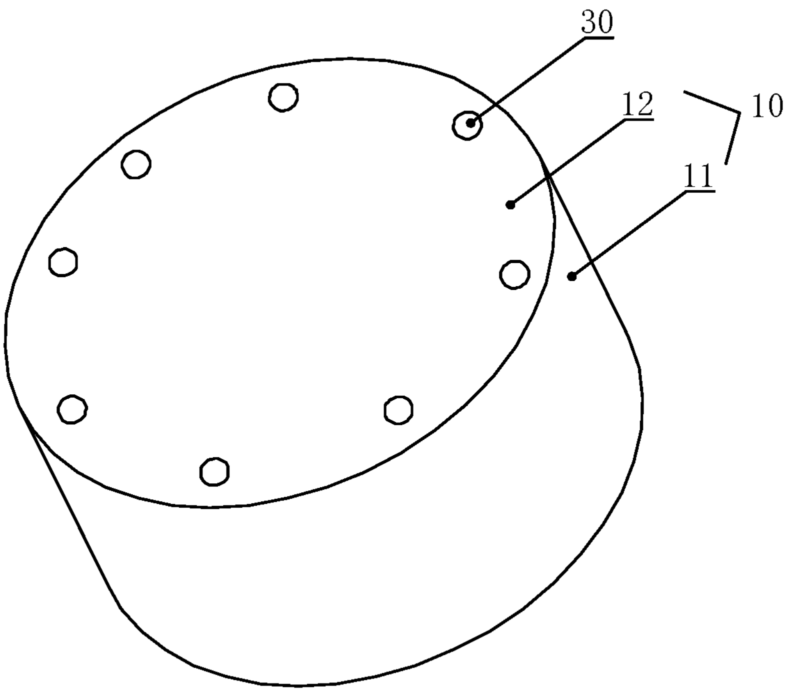
FIGS. 9A and 9B are schematic structures of an exemplary bone conduction speaker according to some embodiments of the present disclosure.
Figure 9B:
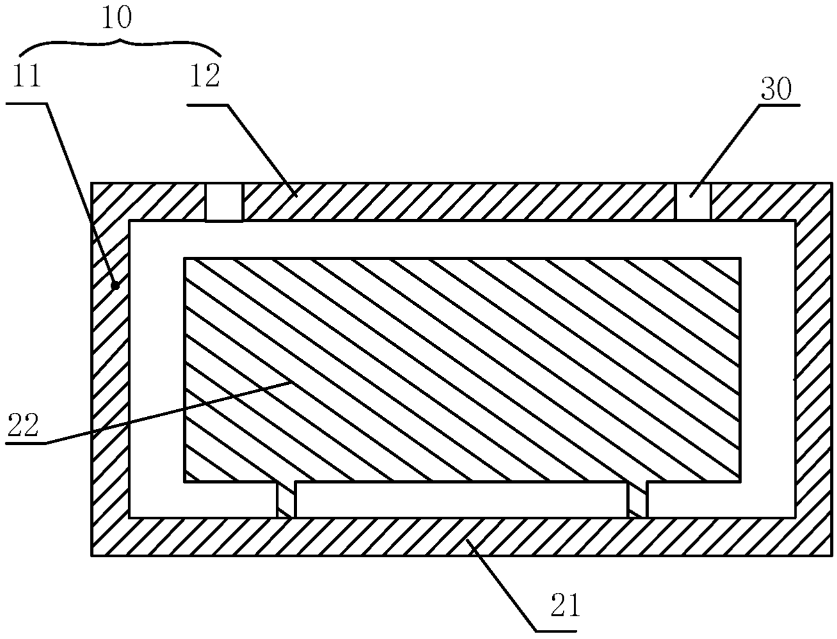

FIGS. 9A and 9B are schematic structures of an exemplary bone conduction speaker according to some embodiments of the present disclosure. The bone conduction speaker may include an open housing 10, a panel 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
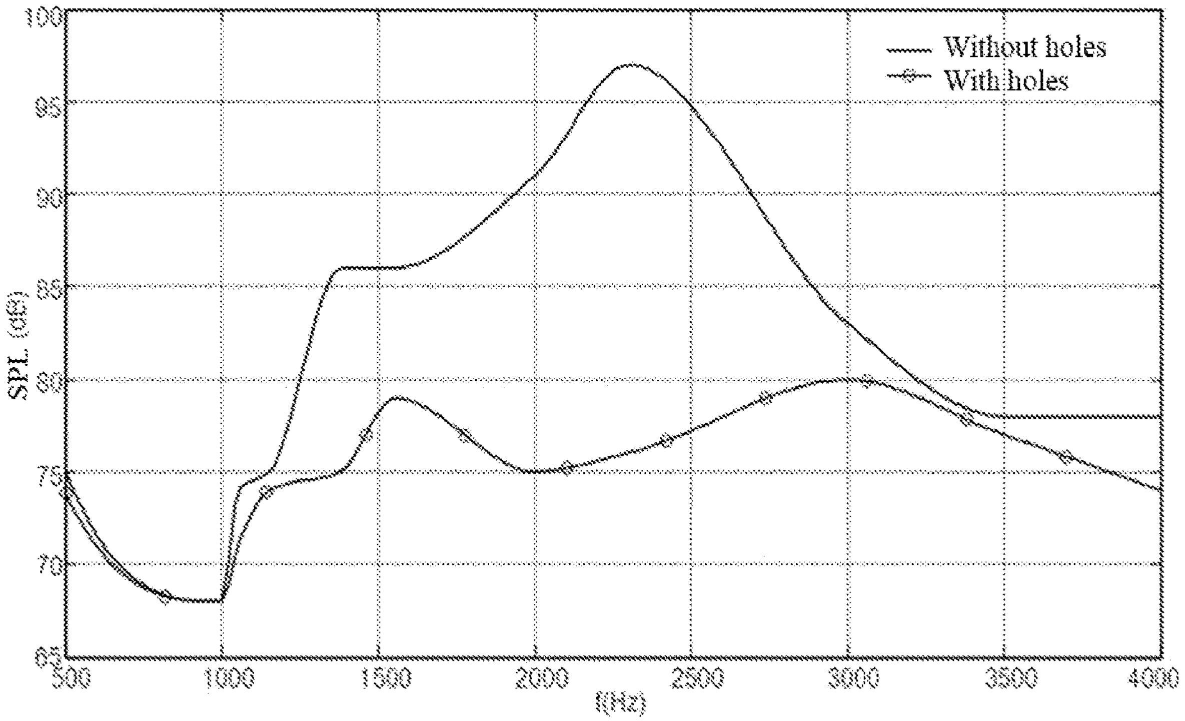
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
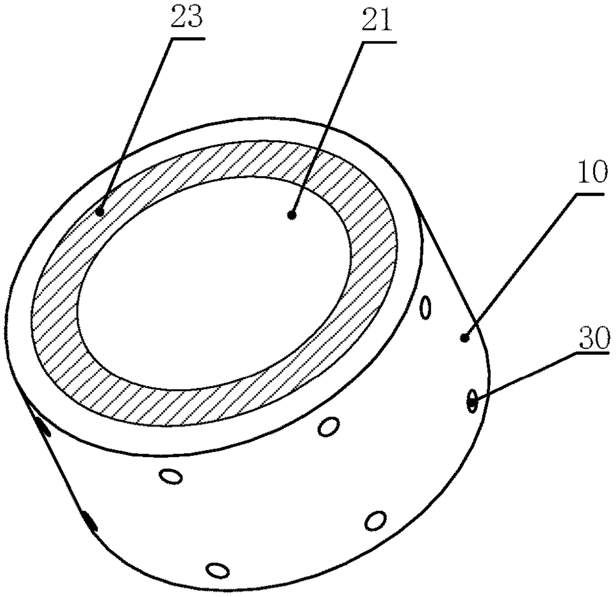
FIGS. 10A and 10B are schematic structures of an exemplary bone conduction speaker according to some embodiments of the present disclosure.
Figure 10B:
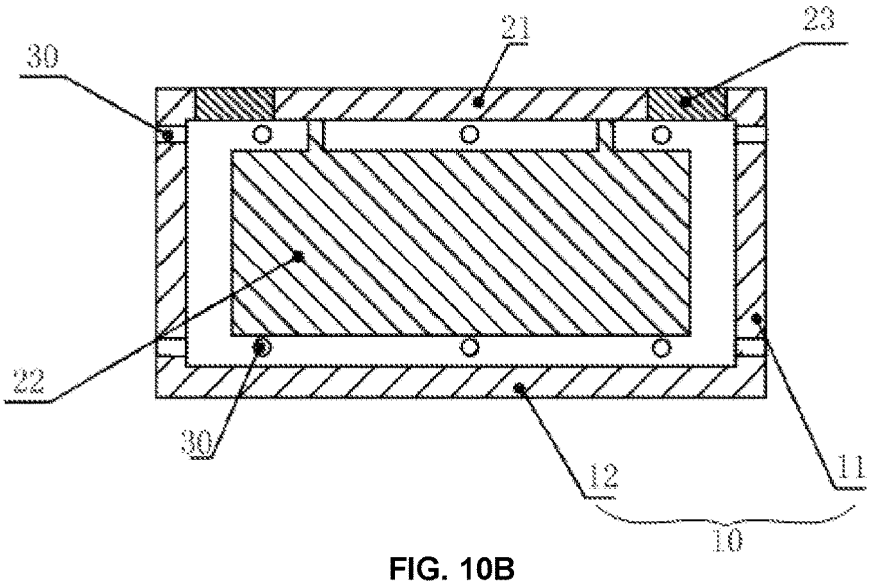

FIGS. 10A and 10B are schematic structures of an exemplary bone conduction speaker according to some embodiments of the present disclosure. The bone conduction speaker may include an open housing 10, a panel 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
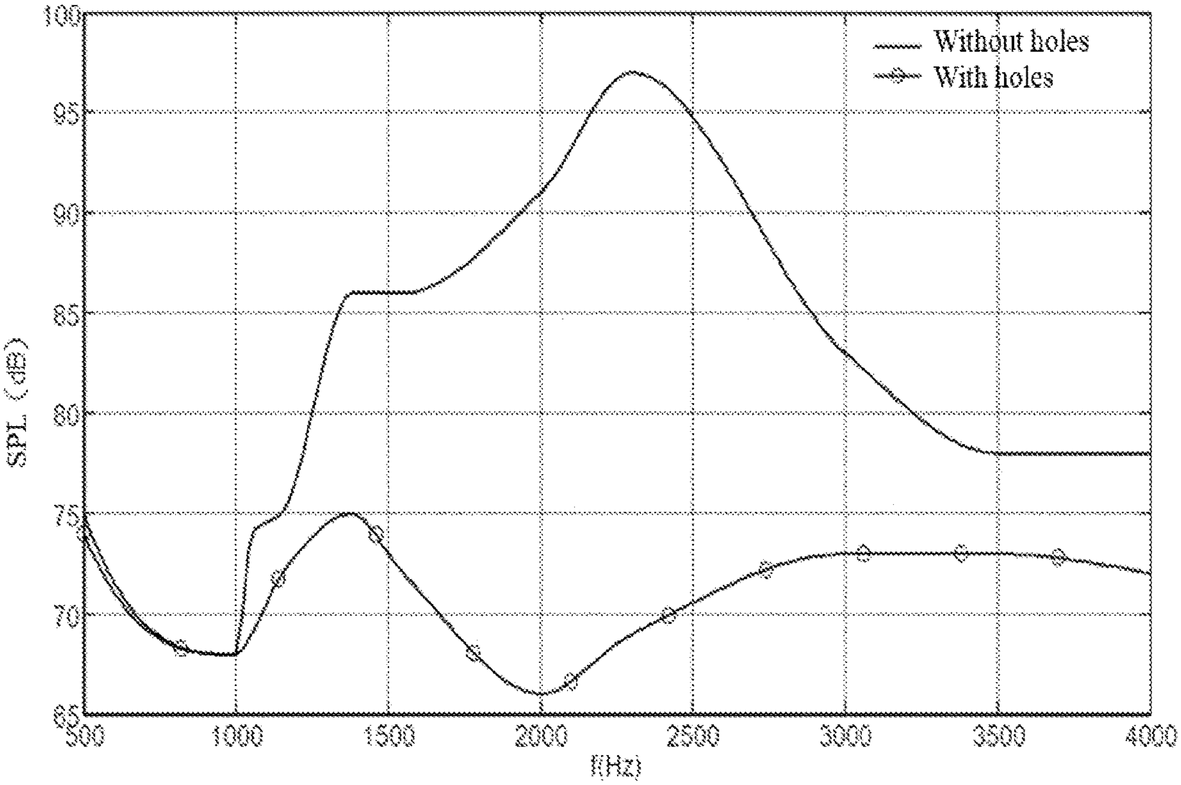
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
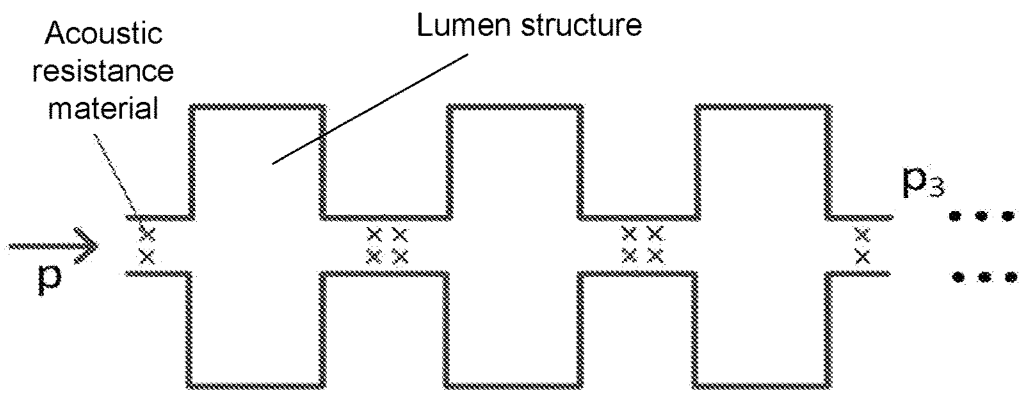
FIG. 10D is a schematic diagram illustrating an acoustic route according to some embodiments of the present disclosure.
Figure 10E:
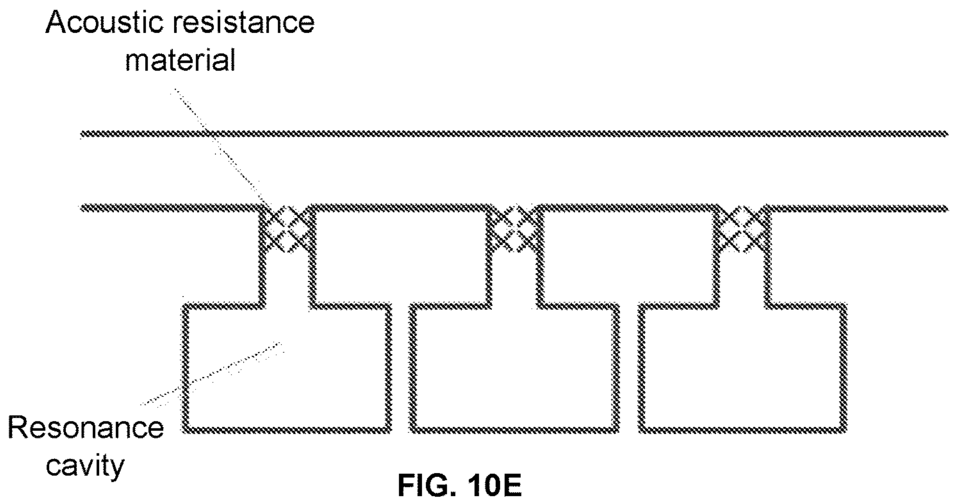
FIG. 10E is a schematic diagram illustrating another acoustic route according to some embodiments of the present disclosure.
Figure 10F:
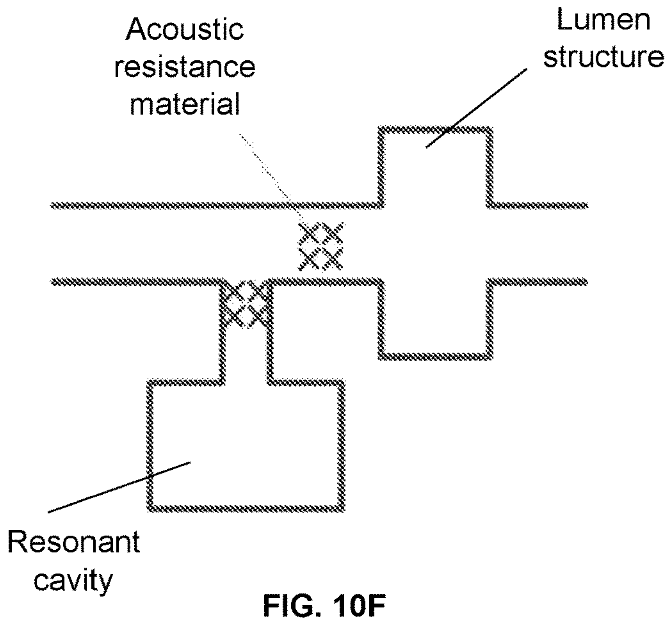
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5 MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
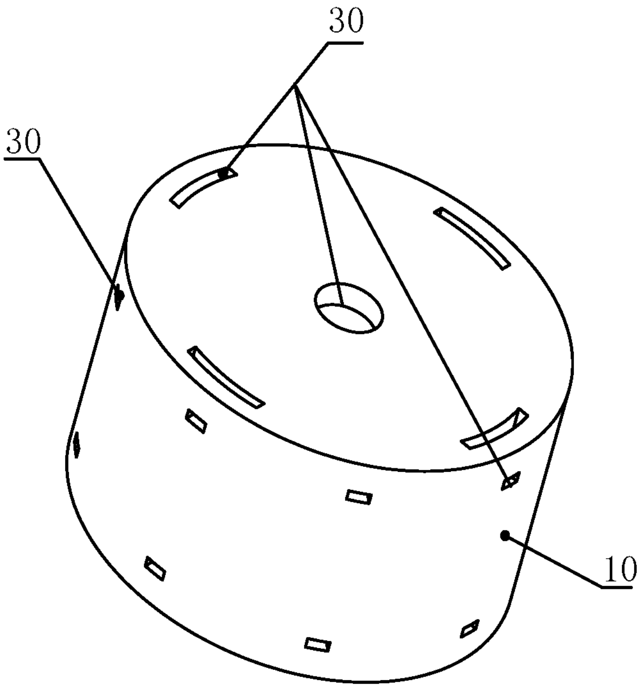
FIGS. 11A and 11B are schematic structures of an exemplary bone conduction speaker according to some embodiments of the present disclosure.
Figure 11B:
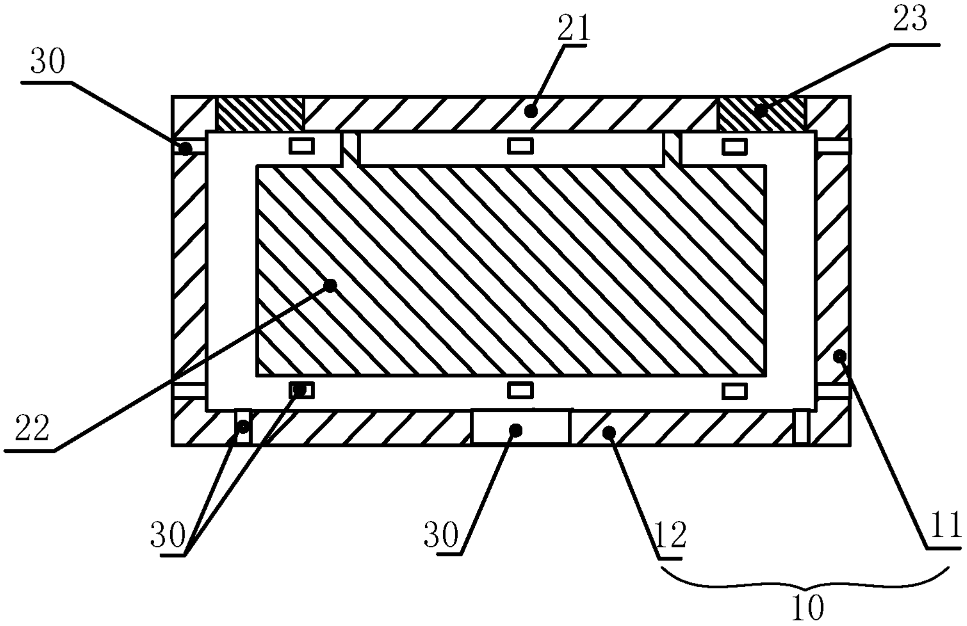

FIGS. 11A and 11B are schematic structures illustrating a bone conduction speaker according to some embodiments of the present disclosure. The bone conduction speaker may include an open housing 10, a panel 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
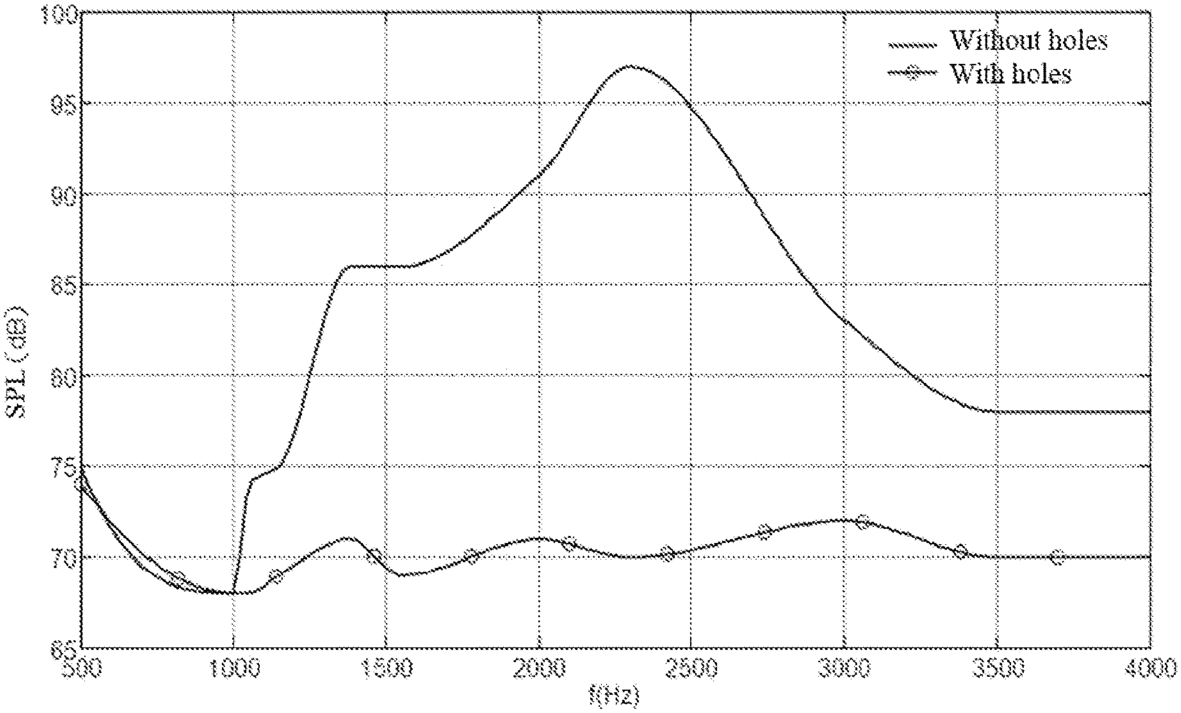
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
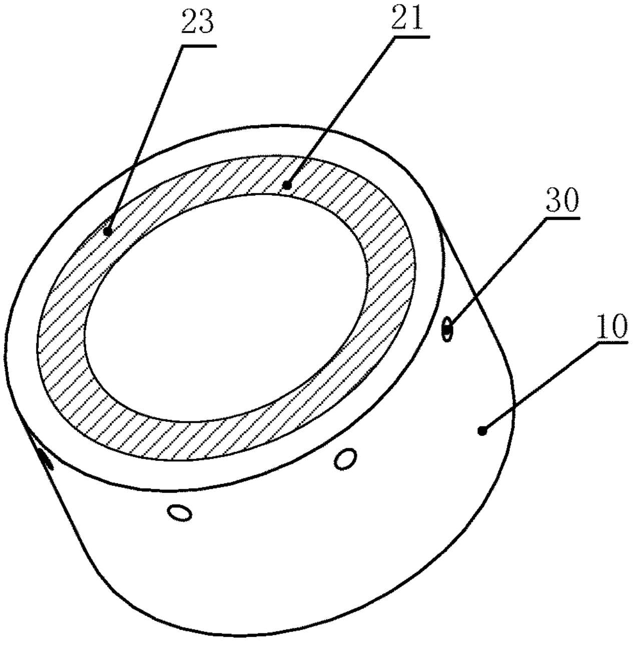
FIGS. 12A and 12B are schematic structures of an exemplary bone conduction speaker according to some embodiments of the present disclosure.
Figure 12B:
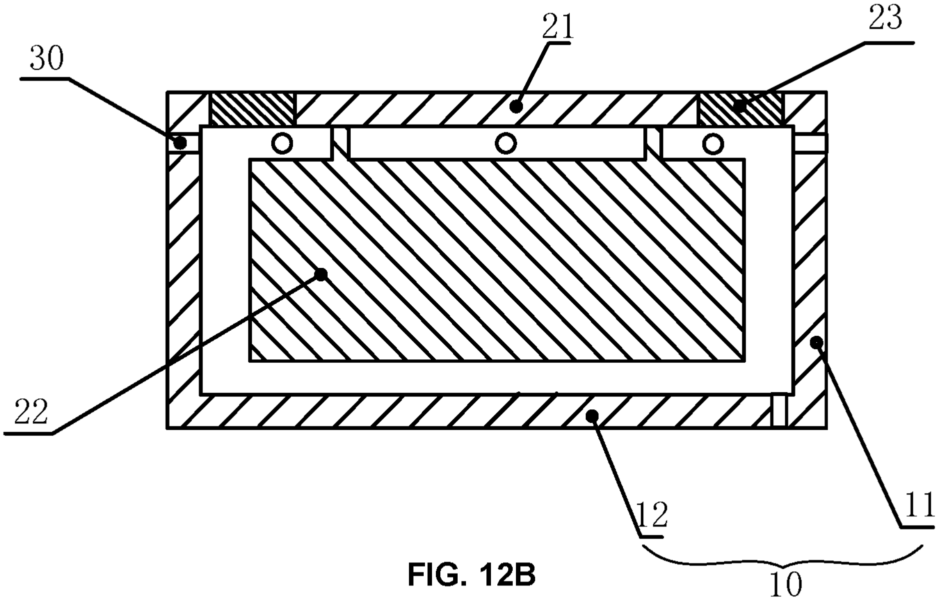

FIGS. 12A and 12B are schematic structures illustrating a bone conduction speaker according to some embodiments of the present disclosure. The bone conduction speaker may include an open housing 10, a panel 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
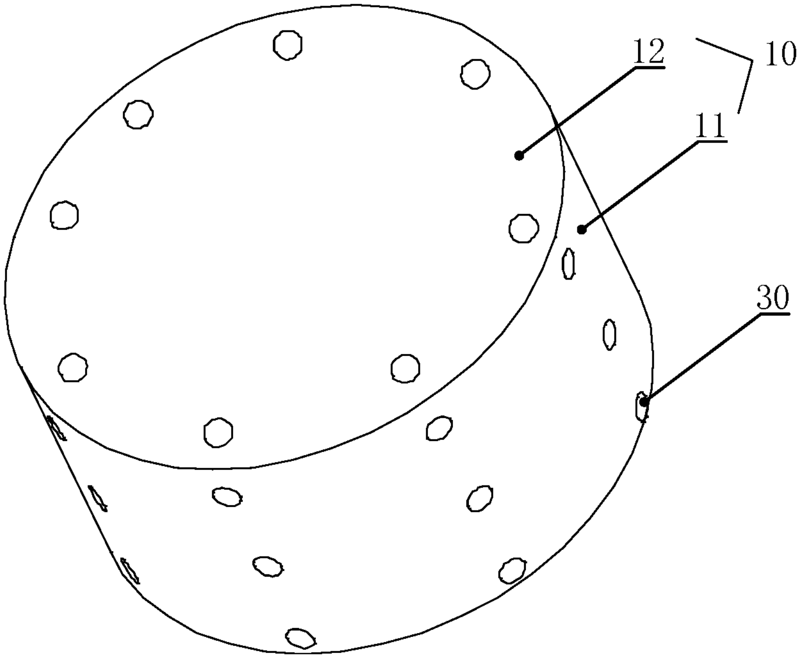
FIGS. 13A and 13B are schematic structures of an exemplary bone conduction speaker according to some embodiments of the present disclosure.
Figure 13B:
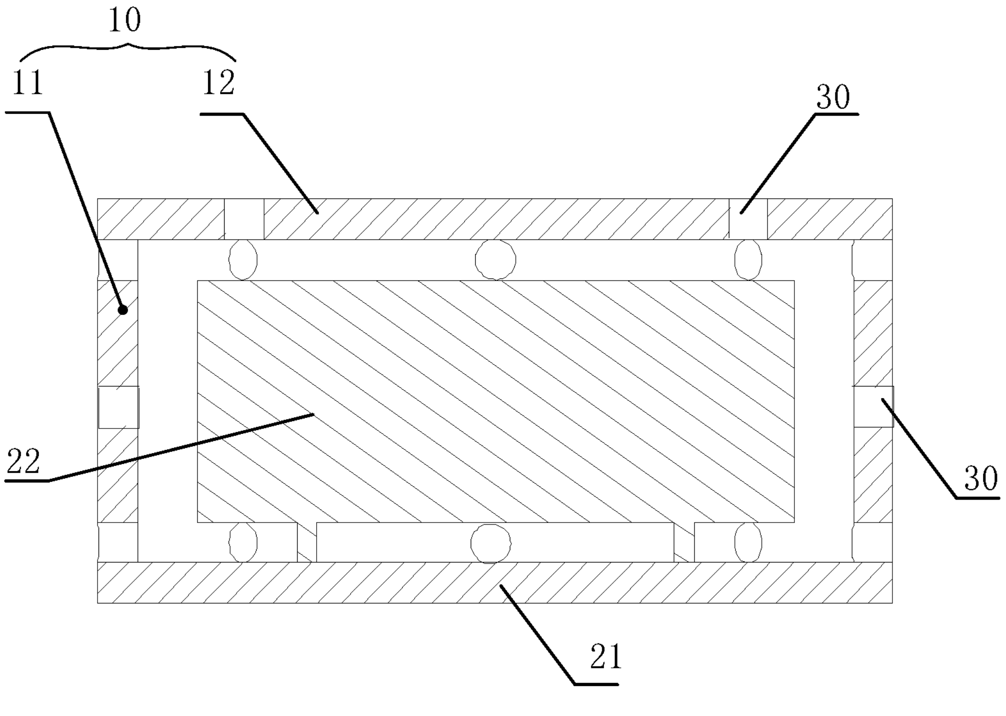

FIGS. 13A and 13B are schematic structures illustrating a bone conduction speaker according to some embodiments of the present disclosure. The bone conduction speaker may include an open housing 10, a panel 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

Figure 14:
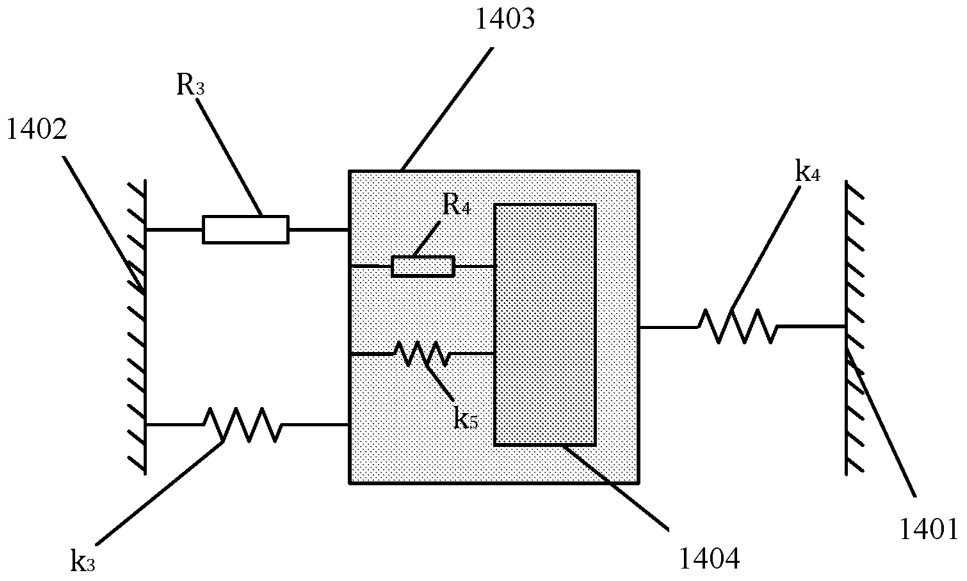
FIG. 14 illustrates an equivalent model of a vibration generation and transferring system of a bone conduction speaker according to some embodiments of the present disclosure.

In general, a sound quality of a bone conduction speaker may be affected by various factors, such as, a physical property of components of the bone conduction speaker, a vibration transfer relationship between the components, a vibration transfer relationship between the bone conduction speaker and external environment, a vibration transfer efficiency of the vibration transfer system, or the like. The components of the bone conduction speaker may include a vibration generation element (such as the transducer 22), a component for fixing the speaker (such as headset bracket/headset lanyard), a vibration transfer component (such as the panel 21 and a vibration transfer layer covering an outer side of the panel 21). The vibration transfer relationships between the components and between the bone conduction speaker and external environment may be determined by the manner that the bone conduction speaker is in contact with a user (such as clamping force, contacting area, contacting shape). FIG. 14 is an equivalent diagram illustrating the vibration generation and vibration transfer system of the bone conduction speaker. The equivalent system of a bone conduction speaker may include a fixed end 1401, a sensor terminal 1402, a vibration unit 1403, and a transducer 1404. The fixed end 1401 may be connected to the vibration unit 1403 through a transfer relationship K1 (i.e., $k_4$ in FIG. 14); the sensor terminal 1402 may be connected to the vibration unit 1403 through the transfer relationship K2 (i.e., $R_3$ and $k_3$ in FIG. 14); the vibration unit 1403 may be connected to the transducer 1404 through the transfer relationship K3 ($R_4$, $k_5$ in FIG. 14).

The vibration unit 1403 may include a panel (e.g., the panel 21) and a transducer (e.g., the transducer 22). The transfer relationships K1, K2 and K3 may be used to describe the relationships between the corresponding components in the equivalent system of the bone conduction speaker (described in detail below). Vibration equations of the equivalent system may be expressed as:

$$m_3x''_3+R_3x'_3-R_4x'_4+(k_3+k_4)x_3+k_5(x_3-x_4)=f_3 \quad (14),$$

$$m_4x''_4+R_4x''_4-k_5(x_3-x_4)=f_4 \quad (15),$$

where, $m_3$ is an equivalent mass of the vibration unit 1403; $m_4$ is an equivalent mass of the transducer 1404; $x_3$ is an equivalent displacement of the vibration unit 1403; $x_4$ is an equivalent displacement of the transducer 1404; $k_3$ is an equivalent elastic coefficient formed between the sensor terminal 1402 and the vibration unit 1403; $k_4$ is an equivalent elastic coefficient formed between the fixed ends 1401 and the vibration unit 1403; $k_5$ is an equivalent elastic coefficient formed between the transducer 1404 and the vibration unit 1403; $R_3$ is an equivalent damping formed between the sensor terminal 1402 and the vibration unit 1403; $R_4$ is an equivalent damping formed between the transducer 1404 and the vibration unit 1403; $f_3$ and $f_4$ are interaction forces between the vibration unit 1403 and the transducer 1404. The equivalent amplitude of the vibration unit $A_3$ is:

$$A_3 = -\frac{m_4\omega^2}{(m_3\omega^2 + j\omega R_3 - (k_3 + k_4 + k_5))(m_4\omega^2 + j\omega R_4 - k_5) - k_5(k_5 - j\omega R_4)} \cdot f_0, , \quad (16)$$

where $f_0$ is a unit driving force, and $\omega$ is a vibration frequency. The factors affecting the frequency response of the bone conduction speaker may include the vibration generation (including but not limited to, the vibration unit, the transducer, the housing, and the connection means between each other, such as $m_3$, $m_4$, $k_5$, $R_4$ in equation (16)), and the vibration transfer (including but not limited to, the way being in contact with skin, the property of headset bracket/headset lanyard, such as $k_3$, $k_4$, $R_3$ in equation (16)). The frequency response and the sound quality of the bone conduction speaker may also be affected by changes of the structure of each component and the parameter of the connection between each component of the bone conduction speaker; for example, changing the size of the clamping force may be equivalent to changing $k_4$, changing the bond with glue may be equivalent to changing $R_4$ and $k_5$, and changing hardness, elasticity, damping of relevant materials may be equivalent to changing $k_3$ and $R_3$.

In an embodiment, the location of the fixed end 1401 may refer to a point or an area relatively fixed at a location in the vibration process, and the point or area may be deemed as the fixed end. The fixed end may be consisted of certain components, or may also be determined by the structure of the bone conduction speaker. For example, the bone conduction speaker may be suspended, adhered, or absorbed around a user's ear, or may attach to a man's skin through special design for the structure or the appearance of the bone conduction speaker.

The sensor terminal 1402 may be an auditory system of a person for receiving a sound signal. The vibration unit 1403 may be used to protect, support, and connect the transducer. The vibration unit 1403 may include a vibration transfer layer for transmitting vibrations to a user, a panel being in contact with a user directly or indirectly, and a housing for protecting and supporting other vibration generation components. The transducer 1404 may generate sound vibrations.

The transfer relationship K1 may connect the fixed end 1401 and the vibration unit 1403, which refers to the vibration transfer relationship between the fixed end and the vibration generation portion. K1 may be determined based on the shape and the structure of the bone conduction speaker. For example, the bone conduction speaker may be fixed on a user's head by a U-shaped headset bracket/the headset lanyard. The bone conduction speaker may also be set on a helmet, a fire mask or a specific mask, a glass, or the like. Different structures and shapes of the bone conduction speaker may affect the transfer relationship K1. Further, the structure of the bone conduction speaker may include the material, mass, etc., of different parts of the bone conduction speaker. The transfer relationship K2 may connect the sensor terminal 1402 and the vibration unit 1403.

K2 may depend on the component of the transfer system. The transfer may include but not limited to transferring sound through a user's tissue to the user's auditory system. For example, when the sound is transferred to the auditory system through the skin, subcutaneous tissue, bones, etc., the physical properties of various parts and mutual connection relationships between the various parts may have impacts on K2. Further, the vibration unit 1403 may be in contact with tissue. In various embodiments, the contact surface may be the vibration transfer layer or the side surface of the panel. The shape and the size of the contact surface, and the force between the vibration unit 1403 and tissue may influence the transfer coefficient K2.

The transfer coefficient K3 between the vibration unit 1403 and the transducer 1404 may be dependent on the connection property inside the vibration generation unit of the bone conduction speaker. The transducer and the vibration unit may be connected rigidly or flexibly, or changing the relative position of the connector between the vibration unit, and the transducer may affect the transducer for transferring vibrations to the vibration unit, especially the transfer efficiency of the panel, thereby affecting the transfer relationship K3.

When the bone conduction speaker is used, the sound generation and transferring process may affect the sound quality that a user feels. For example, the fixed end, the sense terminal, the vibration unit, the transducer and transfer relationship K1, K2 and K3, etc., mentioned above, may have impacts on the sound quality. It should be noted that K1, K2, and K3 are merely descriptions for the connection manners involved in different parts of the apparatus or the system may include but not limited to physical connection manner, force conduction manner, sound transfer efficiency, etc.

The descriptions of the equivalent system of bone conduction speaker are merely a specific embodiment, and it should not be considered as the only feasible embodiment. Apparently, those skilled in the art, after understanding the basic principles of bone conduction speaker, may make various modifications and changes on the type and detail of the vibrations of the bone conduction speaker, but these changes and modifications are still in the scope described above. For example, K1, K2, and K3 described above may refer to a simple vibration or mechanical transfer mode, or they may also include a complex non-linear transfer system. The transfer relationship may be formed by a direct connection between each portion or may be transferred via a non-contact manner.

The transfer relationship K2 between the sensor terminal 1402 and the vibration unit 1403 may also affect the frequency response of the bone conduction system. The volume of a sound heard by a user's ear depends on the energy received by a user's cochlea. The energy may be affected by various parameters during its transmission, which may be expressed by the following equation:

$$P=\iint_S \alpha \cdot f(a,R)\cdot L\cdot ds \quad (17),$$

where P is linear to the energy received by the cochlea, S is the area of a contact surface between the bone conduction speaker and a user's face, α is a coefficient for dimension change, f (a, R) denotes an effect of an acceleration a of a point on the contact surface and tightness R of contact between contact surface and a user's skin on energy transmission, L refers to the damping of any contacting points on the transmission of mechanical wave, i.e., a transmission impedance of a unit area.

In terms of (17), the transmission impedance L may have an impact on the sound transmission, and the vibration transmission efficiency of the bone conduction system may relate to the transmission impedance L. The frequency response curve of the bone conduction system may be a superposition of frequency response curves of multiple points on the contact surface. Factors that change the impedance may include the size of the energy transmission area, the shape of the energy transmission area, the roughness of the energy transmission area, the force on the energy transmission area, or a distribution of the force on the energy transmission area, etc. For example, the transmission effect of sound may change when changing the structure and shape of the vibration unit 1403, thus changing the sound quality of the bone conduction speaker. Merely by way of example, the transmission effect of sound may be changed by changing the corresponding physical characteristic of the contact surface of the vibration unit 1403.

Figure 15A:
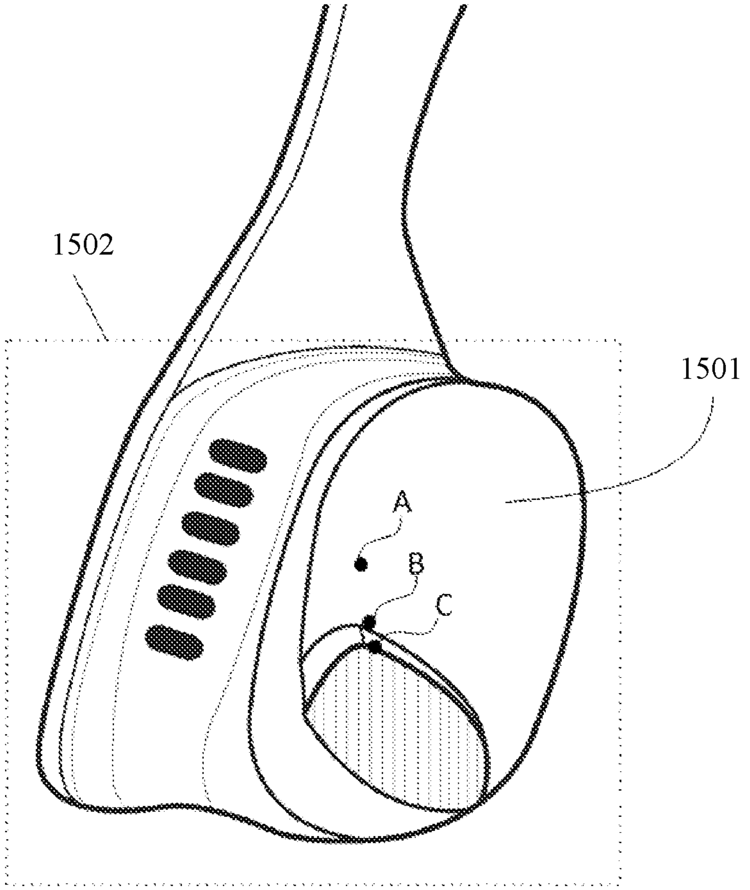
FIG. 15A illustrates a structure of a contact surface of a vibration unit of a bone conduction speaker according to some embodiments of the present disclosure.

A well-designed contact surface may have a gradient structure, and the gradient structure may refer to an area with various heights on the contact surface. The gradient structure may be a convex/concave portion or a sidestep that exists on an outer side (towards a user) or inner side (backward a user) of the contact surface. An embodiment of a vibration unit of the bone conduction speaker may be illustrated in FIG. 15A. A convex/concave portion (not shown in FIG. 15A) may exist on a contact surface 1501 (an outer side of the contact surface). During the operation of the bone conduction speaker, the convex/concave portion may be in contact with a user's face, changing the forces between different positions on the contact surface 1501 and a user's face. A convex portion may be in contact with a user's face in a tighter manner; thus the force on the skin and tissue of a user that contact with the convex portion may be larger, and the force on the skin and tissue that contact with a concave portion may be smaller accordingly. For example, three points A, B, and C on the contact surface 1501 in FIG. 15A may be located on a non-convex portion, an edge of a convex portion, and a convex portion, respectively. When being in contact with a user's skin, clapping forces $F_A$, $F_B$, and $F_C$ on the three points may be $F_C>F_A>F_B$. In some embodiments, a clamping force on the point B may be 0; i.e., the point B may not be in contact with the skin of a user. The skin and tissue of a user's face may have different impedances and responses under different forces. The part of a user's face under a larger force may correspond to a smaller impedance rate and have a high-pass filtering characteristic for an acoustic wave. The part under a smaller force may correspond to a larger impedance rate, and have a low-pass filtering characteristic for an acoustic wave. Different parts of the contact surface 1501 may correspond to different impedance characteristics L. Different parts may correspond to different frequency responses for sound transmission. The transmission effect of the sound via the entire contact surface may be equivalent to a sum of transmission effect of the sound via each part of the contact surface. A smooth curve may be formed when the sound transmits into a user's brain, which may avoid exorbitant harmonic peak under a low frequency or a high frequency, thus obtaining an ideal frequency response across the whole bandwidth. Similarly, the material and thickness of the contact surface 1501 may have an effect on the transmission effect of the sound, thus affecting the sound quality. For example, when the contact surface is soft, the transmission effect of the sound in the low frequency range may be better than that in the high frequency range, and when the contact surface is hard, the transmission effect of the sound in the high frequency range may be better than that in the low frequency range.

Figure 15B:
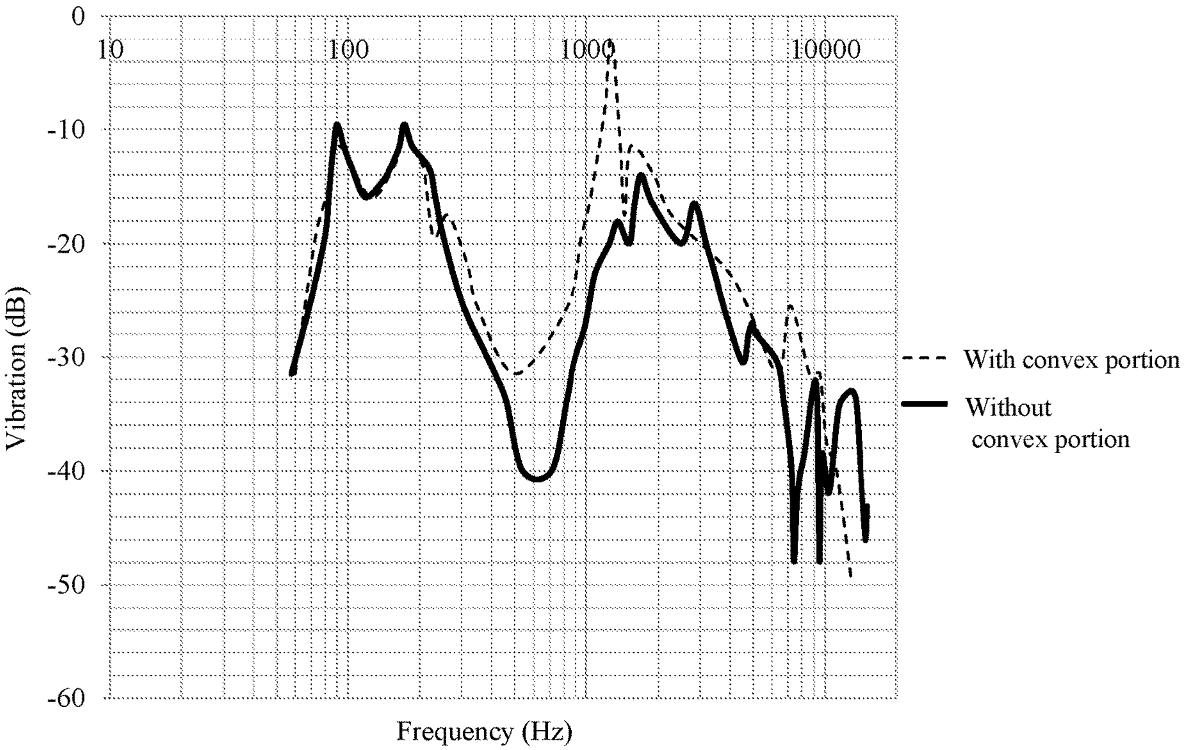
FIG. 15B illustrates a vibration response curve of a bone conduction speaker according to some embodiments of the present disclosure.

FIG. 15B shows response curves of the bone conduction speaker with different contact areas. The dotted line corresponds to the frequency response of the bone conduction speaker having a convex portion on the contact surface. The solid line corresponds to the frequency response of the bone conduction speaker having a non-convex portion of the contact surface. In a low-intermediate frequency range, the vibration of the non-convex portion may be weakened relative to that of the convex portion, which may form one "pit" on the frequency response curve, indicating that the frequency response is not ideal and may influence the sound quality.

The above descriptions of the FIG. 15B are merely the explanation for a specific embodiment, and those skilled in the art, after understanding the basic principles of bone conduction speaker, may make various modifications and changes on the structure and the components to achieve different frequency response effects.

It should be noted that for those skilled in the art, the shape and the structure of the contact surface may not be limited to the descriptions above. In some embodiments, the convex portion or the concave portion may be located at an edge of the contact surface or may be located at the center of the contact surface. The contact surface may include one or more convex portions or concave portions. The convex portion and/or concave portion may be located on the contact surface. The material of the convex portion or the concave portion may be different from the material of the contact surface, such as flexible material, rigid material, or a material easy to produce a specific force gradient. The material may be memory material or non-memory material; the material may be a single material or composite material. The structure pattern of the convex portion or concave portion of the contact surface may include but not limited to axial symmetrical pattern, central symmetrical pattern, symmetrical rotational pattern, asymmetrical pattern, etc. The structure pattern of the convex portion or the concave portion on the contact surface may include one pattern, two patterns, or a combination of two or patterns. The contact surface may include but not limited to a certain degree of smoothness, roughness, waviness, or the like. The distribution of the convex portions or the concave portions on the contact surface may include but not limited to axial symmetry, the center of symmetry, rotational symmetry, asymmetry, etc. The convex portion or the concave portion may be set at an edge of the contact surface or may be distributed inside the contact surface.

It should be noted that, the gradient structure on the contact surface in a bone conduction speaker disclosed in the present disclosure is also applicable for an air conduction speaker. For example, the air conduction speaker may include a gradient structure that exists on an outer side (towards a user) or inner side (backward a user) of a contact surface between the air conduction speaker and the user's face. In some embodiments, the gradient structure on the outer side of the contact surface may match the shape of the user's auricle (e.g., the shape of *Fossa triangularis*, the shape of anthelix, etc.) such that the user such can wear the air conduction speaker more comfortably. Optionally or additionally, the air conduction speaker or the bone conduction speaker may include one or more sound guiding holes. The one or more sound guiding holes may be configured to guide sound waves inside a housing of the air conduction speaker or the bone conduction speaker through the one or more sound guiding holes to an outside of the housing. The one or more sound guiding holes may be located on a same wall or different walls of the housing. Merely by way of example, the one or more sound guiding holes may include two sound guiding holes. One sound guiding hole may be located on the contact surface of the air conduction speaker. The other sound guiding hole may be located on a wall (e.g., a sidewall) of the housing different from the contact surface.

Figure 16:
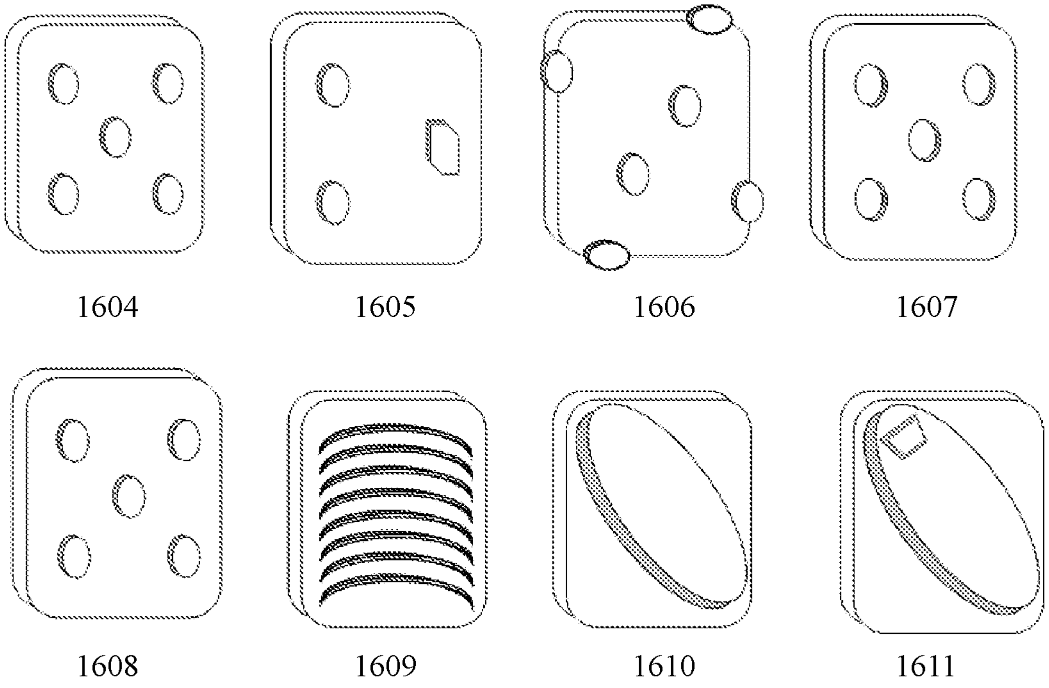
FIG. 16 illustrates a structure of a contact surface of a vibration unit of a bone conduction speaker according to some embodiments of the present disclosure.

1604-1611 in FIG. 16 are embodiments of the structure of the contact surface.

1604 in FIG. 16 shows multiple convex portions with similar shapes and structures on the contact surface. The convex portions may be made of a same material or similar materials as other parts of the panel, or different materials. In particular, the convex portions may be made of a memory material and the material of the vibration transfer layer, wherein the proportion of the memory material may be not less than 10%. Preferably, the proportion may be not less than 50%. The area of a single convex portion may be 1%-80% of the total area, preferably 5%-70%, and more preferably 8%-40%. The sum of the area of the convex portions may be 5%-80% of the total area, preferably 10%-60%. There may be at least one convex portion, preferably one convex portion, more preferably two convex portions, and further preferably at least five convex portions. The shapes of the convex portions may be circular, oval, triangular, rectangular, trapezoidal, irregular polygons or other similar patterns, wherein the structures of the convex portions may be symmetrical, or asymmetrical, the distribution of the convex portions may be symmetrically distributed or asymmetrically distributed, the number of the convex portions may be one or more, the heights of the convex portions may be the same or different, and the height distribution of the convex portions may form a certain gradient.

1605 in FIG. 16 shows an embodiment of convex portions on the contact surface with two or more structure patterns. There may be one or more convex portions of different patterns. Shapes of the two or more convex portions may be circular, oval, triangular, rectangular, trapezoidal, irregular polygons, other shapes, or a combination of any two or more shapes. The material, quantity, size, symmetry of the convex portions may be similar to that as illustrated in 1604.

1606 in FIG. 16 shows an embodiment that the convex portions may be distributed at edges of the contact surface or in the contact surface. The number of the convex portions located at edges of the contact surface may be 1% to 80% of the total number of the convex portions, preferably 5%-70%, more preferably 10%-50%, and more preferably 30%-40%. The material, quantity, size, shape, or symmetry of the convex portions may be similar to 1604.

1607 in FIG. 16 shows a structure pattern of concave portions on the contact surface. The structures of the concave portions may be symmetrical or asymmetrical, the distribution of the concave portions may be symmetrical or asymmetrical, the number of the concave portions may be one or more than one, the shapes of the concave portions may be same or different, and the concave portions may be hollow. The area of a single concave portion may be not less than 1%-80% of the total area of the contact surface, preferably 5%-70%, and more preferably 8%-40%. The sum of the area of all concave portions may be 5%-80% of the total area, preferably 10%-60%. There may be at least one concave, preferably one, more preferably two, and more preferably at least five. The shapes of the concave portions may be circular, oval, triangular, rectangular, trapezoidal, irregular polygons or other similar patterns.

1608 in FIG. 16 shows a contact surface including convex portions and concave portions. There may be one or more convex portions and one or more concave portions. The ratio of the number of the concave portions to the convex portions may be 0.1%-100%, preferably 1%-80%, more preferably 5%-60%, further preferably 10%-20%. The material, quantity, size, shape, or symmetry of each convex portion or each concave portion may be similar to 1604.

1609 in FIG. 16 shows an embodiment of the contact surface having a certain waviness. The waviness may be formed by two or more convex/concave portions. Preferably, the distances between adjacent convex/concave portions may be equal. More preferably, the distances between convex/concave portions may be presented in an arithmetic progression.

1610 in FIG. 16 shows an embodiment of a convex portion having a large area on the contact surface. The area of the convex portion may be 30%-80% of the total area of the contact surface. Preferably, a part of an edge of the convex portion may substantially contact with a part of an edge of the contact surface.

1611 in FIG. 16 shows a first convex portion having a large area on the contact surface, and a second convex portion on the first convex portion may have a smaller area. The area of the convex portion having a larger area may be 30%-80% of the total area, and the area of the convex portion having a smaller area may be 1%-30% of the total area, preferably 5%-20%. The area of the smaller area may be 5%-80% that of the larger area, preferably 10%-30%.

The above descriptions of the contact surface structure of the bone conduction speaker are merely a specific embodiment, and it may not be considered the only feasible implementation. Apparently, those skilled in the art, after understanding the basic principles of bone conduction speaker, may make various modifications and changes in the type and detail of the contact surface of the bone conduction speaker, but these changes and modifications are still within the scope described above. For example, the count of the convex portions and the concave portions may not be limited to that of the FIG. 16, and modifications made on the convex portions, the concave portions, or the patterns of the contact surface may remain in the descriptions above. Moreover, the contact surface of at least one vibration unit of the bone conduction speaker may have the same or different shapes and materials. The effect of vibrations transferred via different contact surfaces may have differences due to the properties of the contact surfaces, which may result in different sound effects.

Figure 17:
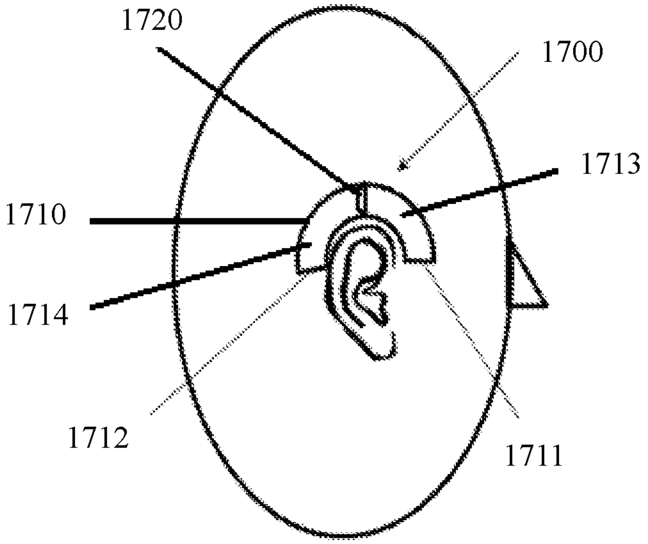
FIG. 17 is a schematic diagram illustrating an exemplary acoustic output device according to some embodiments of the present disclosure.

In some embodiments, the acoustic output devices described above may include or be connected with one or more supporting structure such that, when worn by a user, the acoustic output devices described above can be placed at a position near the ear of the user, e.g., at a specific position close to but not block the ear canal of the user. FIG. 17 is a schematic diagram illustrating an exemplary acoustic output device according to some embodiments of the present disclosure. As shown in FIG. 17, an acoustic output device 1700 may include a supporting structure 1710 and an acoustic driver (also referred to as "transducer" as described elsewhere in the description) 1720, which may be disposed in the supporting structure 1710. In some embodiments, the acoustic output device 1700 may be worn on a user's body (e.g., the head, the neck, the upper torso, etc. of the user) e.g., through the supporting structure 1710. The supporting structure 1710 and the acoustic driver 1720 may be close to and not block an ear canal of the user. The ear of the user may be in an open state. The user may hear a sound output from the acoustic output device 1700 and a sound from an external source. For example, the acoustic output device 1700 may be arranged around or partially around the user's ear and may transmit the sound via an air conduction manner or a bone conduction manner. In some embodiments, the acoustic output device 1700 may have a structure that is similar to or same as the bone conduction speaker or the air conduction speaker described above.

The supporting structure 1710 may be configured to support one or more acoustic drivers 1720. In some embodiments, the supporting structure 1710 may include an enclosed shell structure with an internal hollow, and the one or more acoustic drivers 1720 may be disposed in the supporting structure 1710. In some embodiments, the acoustic output device 1700 may be combined with a product such as a pair of glasses, a headset, a display device, an AR/VR helmet, etc. In this case, the supporting structure 1710 may be placed near the user's ear via a hanging manner or a clamping manner. In some embodiments, the supporting structure 1710 may include an ear hook, a shape of the ear hook may be matched the shape of the auricle, and the acoustic output device 1700 may be worn on the user's ear through the ear hook, independently.

In some embodiments, the supporting structure 1710 may include a shell structure, and a shape of the supporting structure 1710 may be matched a shape of the ear of the user. The shape of the supporting structure 1710 may include a circular ring, an oval, a (regular or irregular) polygonal, a U-shape, a V-shape, a semi-circle, etc., and the supporting structure 1710 may be directly anchored at the user's ear. In some embodiments, the supporting structure 1710 may also include one or more fixed parts. The fixed part may include an ear hook, a head beam, an elastic band, or the like, or any combination thereof, which may be used to fix the acoustic output device 1700 on the user and prevent the acoustic output device 1700 from falling. Merely by way of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 1700 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc.), and the rigid portion may be fixed to the supporting structure 1710 of the acoustic output device 1700 via a physical connection (e.g., a snap connection, a screw connection, etc.). The flexible portion may be made of an elastic material (e.g., a cloth, a composite material, a neoprene, etc.).

In some embodiments, when the user wears the acoustic output device 1700, the supporting structure 1710 may be placed above or below the auricle. The supporting structure 1710 may also include a sound guiding hole 1711 and a sound guiding hole 1712, which may be configured to transmit sounds. In some embodiments, the sound guiding hole 1711 and the sound guiding hole 1712 may be placed on two sides of the user's auricle, respectively. The acoustic driver 1720 may output sound(s) through the sound guiding hole 1711 and/or the sound guiding hole 1712.

The acoustic driver 1720 may be configured to receive an electrical signal, and convert the electrical signal into a voice signal which may be output. In some embodiments, a type of the acoustic driver 1720 may include an acoustic driver with a low-frequency, an acoustic driver with a high-frequency, an acoustic driver with a full-frequency, or the like, or any combination thereof, according to the frequency of the acoustic driver 1720. In some embodiments, the acoustic driver 1720 may include a moving coil acoustic driver, a moving iron acoustic driver, a piezoelectric acoustic driver, an electrostatic acoustic driver, a magnetostrictive acoustic driver according to a principle of the acoustic driver 1720.

In some embodiments, the acoustic driver 1720 may include a vibration diaphragm. When the vibration diaphragm vibrates, sounds may be transmitted from a front side and a rear side of the vibration diaphragm, respectively. In some embodiments, a front chamber 1713 may be disposed on the front side of the vibration diaphragm in the supporting structure 1710, which may be configured to transmit the sound(s). The front chamber 1713 may be acoustically coupled with the sound guiding hole 1711. The sound transmitted from the front side of the vibration diaphragm may be transmitted from the sound guiding hole 1711 through the front chamber 1713. A rear chamber 1714 may be disposed on the rear side of the vibration diaphragm in the supporting structure 1710, which may be configured to transmit the sound(s). The rear chamber 1714 may be acoustically coupled with the sound guiding hole 1712. The sound transmitted from the rear side of the vibration diaphragm may be transmitted from the sound guiding hole 1712 through the rear chamber 1714. It should be noted that, when the vibration diaphragm vibrates, the front side and the rear side of the vibration diaphragm may simultaneously generate sounds with opposite phases. After passing through the front chamber 1713 and rear chamber 1714, respectively, the sounds may be transmitted outward from the sound guiding hole 1711 and the sound guiding hole 1712. In some embodiments, the sounds output by the acoustic driver 1720, which may be transmitted through the sound guiding hole 1711 and the sound guiding hole 1712 may meet the specific requirement by setting a structure of at least one of the front chamber 1713 and the rear chamber 1714. For example, the sound guiding hole 1711 and the sound guiding hole 1712 may transmit a set of sounds with a specific phase relationship (e.g., opposite phases) by designing a length of at least one of the front chamber 1713 and the rear chamber 1714, thereby increasing a volume in the near-field of the acoustic output device 1700, avoiding sound leakage of the acoustic output device 1700, and effectively improving the performance of the acoustic output device 1700. As used herein, a length of a front chamber refers to a length of a route between the vibration diaphragm to a sound guiding hole coupled with the front chamber when a sound (i.e., vibration) propagates from the vibration diaphragm to the sound guiding hole along the route, and a length of a rear chamber refers to a length of a route between the vibration diaphragm to a sound guiding hole coupled with the rear chamber when a sound (i.e., vibration) propagates from the vibration diaphragm to the sound guiding hole along the route.

In some alternative embodiments, the acoustic driver 1720 may include a plurality of vibration diaphragms (e.g., two vibration diaphragms). The plurality of vibration diaphragms may vibrate to generate sounds, respectively. Each of the sounds may be transmitted pass through a chamber that is connected to one of the vibration diaphragms in the supporting structure and may be output from a corresponding sound guiding hole. The plurality of vibration diaphragms may be controlled by the same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

Figure 18:
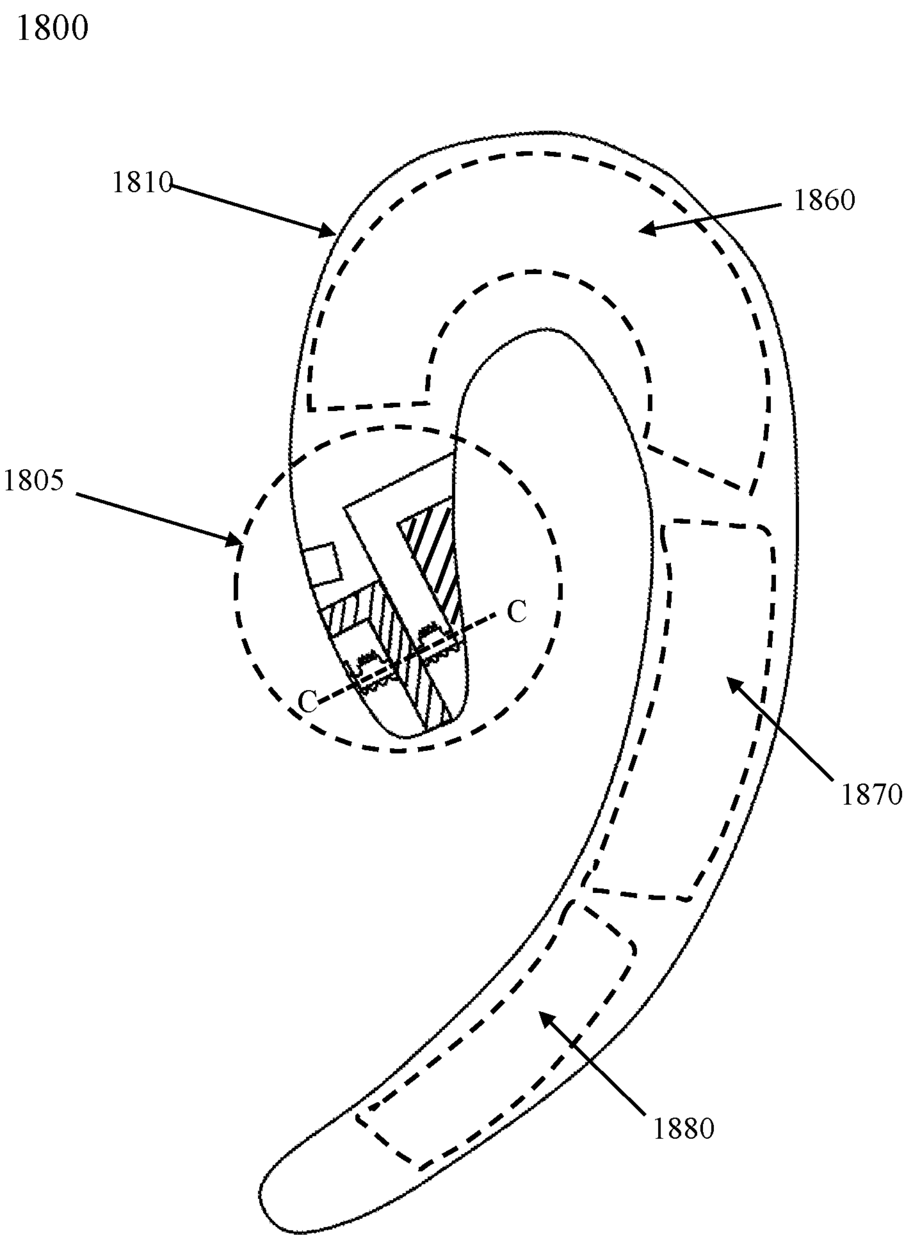
FIG. 18 is a cross-sectional view of an exemplary acoustic output device which has the form of an open binaural earphone according to some embodiments of the present disclosure.
Figure 19:
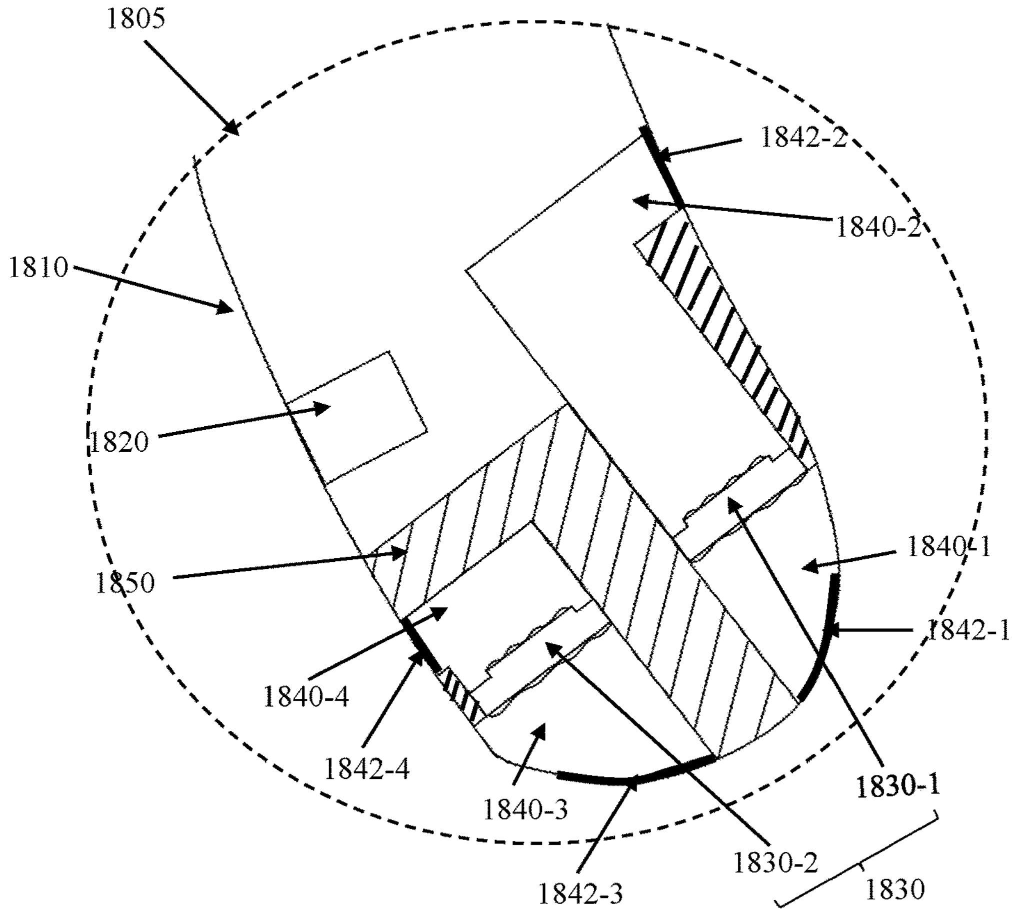
FIG. 19 is a schematic diagram illustrating a sound generation structure of an exemplary open binaural earphone according to some embodiments of the present disclosure.
Figure 20:
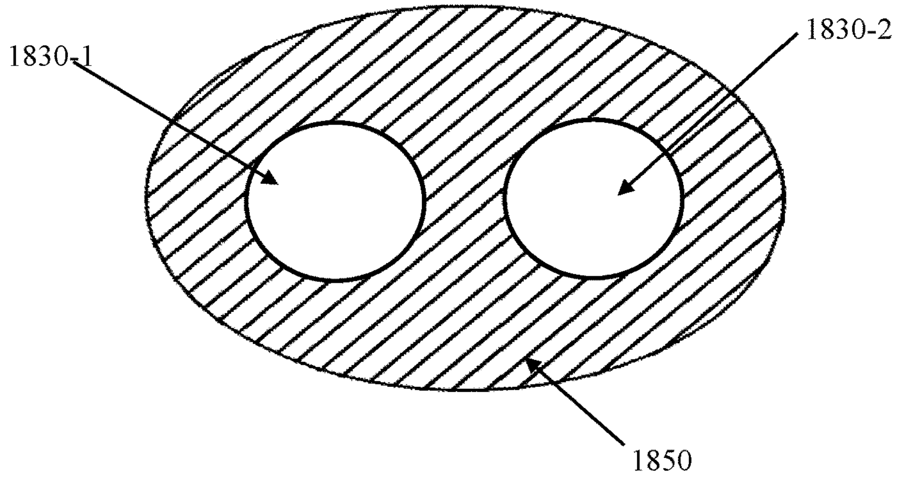
FIG. 20 is a cross-sectional view of a baffle of an exemplary open binaural earphone according to some embodiments of the present disclosure.

FIG. 18 is a cross-sectional view of an exemplary acoustic output device which has the form of an open binaural earphone according to some embodiments of the present disclosure. FIG. 19 is a schematic diagram illustrating a sound generation structure of an exemplary open binaural earphone according to some embodiments of the present disclosure. In some embodiments, a sound generation structure 1900 may be an exemplary embodiment of an open binaural earphone 1800. For example, FIG. 19 may be an enlarged view of the sound generation structure 1805 in FIG. 18. FIG. 20 is a cross-sectional view of a baffle of an exemplary open binaural earphone according to some embodiments of the present disclosure. In some embodiments, the cross-sectional view of a baffle 1700 in FIG. 20 may be an exemplary embodiment of a cross-sectional view of a baffle of the open binaural earphone 1800 along a C-C section. As shown in FIG. 18, FIG. 19, and FIG. 20, the open binaural earphone 1800 may include a housing 1810, at least one microphone 1820, one or more acoustic drivers 1830, and at least one guiding tube (e.g., a guiding tube 1840-1, a guiding tube 1840-2, a guiding tube 1840-3, a guiding tube 1840-4, etc.) corresponding to the acoustic driver(s) 1830, the baffle 1850, a circuit board 1860, a Bluetooth module 1870, and a power source module 1880. In some embodiments, the open binaural earphone 1800 may further include an electronic frequency division unit (not shown in the figure, please refer to the electronic frequency division unit 110). In some embodiments, the electronic frequency division unit, the acoustic driver(s) 1830, and the guiding tube may be collectively referred to as an acoustic output device. More descriptions regarding the acoustic output device may be found elsewhere in the present disclosure. See, e.g., FIG. 1 to FIG. 17 and the relevant descriptions thereof.

In some embodiments, the electronic frequency division unit may be disposed in the housing 1810. Exemplary electronic frequency division units may include a passive filter, an active filter, an analog filter, a digital filter, or the like, or any combination thereof. In some embodiments, the acoustic driver(s) 1830 with different frequency response characteristics (e.g., a low-frequency transducer, an intermediate-frequency transducer, and/or a high-frequency transducer) may be disposed, and the transducers with different frequency responses may output sound including different frequency components. In some embodiments, frequency division processing of an audio signal may also be implemented in acoustic routes. For example, the acoustic driver(s) 1830 may generate a full-band sound, and the sound output by the acoustic driver(s) 1830 may be acoustically filtered in acoustic routes with different acoustic impedances, and the sound output through different acoustic routes may have different frequency components. More descriptions regarding the frequency division based on acoustic routes may be found elsewhere in the present disclosure. See, e.g., FIGS. 10D to 10F and the relevant descriptions thereof. In some embodiments, the frequency division processing of the audio signal may be implemented by two or more of the manners mentioned above.

Voice signals with different frequency components generated by the acoustic driver(s) 1830 may be output to the user from different sound guiding holes 1842 (e.g., a sound guiding hole 1842-1, a sound guiding hole 1842-2, a sound guiding hole 1842-3, a guide hole 1842-4, etc.) through the guiding tube. It should be noted that the guiding tube may be only an exemplary embodiment of the acoustic route through which sound may propagate in the open binaural earphone 1800. Those skilled in the art may use other acoustic routes (e.g., an acoustic cavity, a resonant cavity, an acoustic hole, an acoustic slit, a tuning net, etc., or any combination thereof) or other ways to make the sound propagate in the open binaural earphone 1800, which may be not limited herein.

In some embodiments, frequency-divided signals generated after the audio signal is processed may have narrower frequency bands than a frequency band of the audio signal. The frequency bands of the frequency-divided signals may be within the frequency band of the audio signal. For example, the frequency band of the audio signal may be from 10 Hz to 30 kHz. The frequency bands of the frequency-divided signal may be 100 Hz to 200 Hz, which may be narrower than the frequency band of the audio signal and within the frequency band of the audio signal. In some embodiments, a combination of the frequency bands of the frequency-divided signals may cover the frequency band of the audio signal. Additionally or alternatively, the combination of frequency bands of the frequency-divided signal may partially cover the frequency band of the audio signal. In some embodiments, at least two of the frequency-divided signals may have different frequency bands. As used herein, the different frequency bands may refer to two frequency bands that have different frequency band center values and/or different frequency bandwidths. Optionally, each frequency-divided signal may have a characteristic frequency band that is different from that of other frequency-divided signals. That is, the frequency band of a frequency-divided signal may not overlap with the frequency bands of other frequency-divided signals. Different frequency-divided signals may have the same frequency bandwidth or different frequency bandwidths. In some embodiments, an overlap between the frequency bands of two adjacent frequency-divided signals in a frequency domain may be avoided, thereby improving the quality of the output sound. Among the generated frequency-divided signals, two frequency-divided signals with close center frequencies may be considered to be adjacent to each other in the frequency domain. More descriptions regarding the frequency bands of a pair of adjacent frequency-divided signals may be found elsewhere in the present disclosure. In some embodiments, a low-frequency sound and a high-frequency sound actually output by the open binaural earphone 1800 may be affected by various factors such as filtering characteristics of actual circuits, frequency characteristics of the transducers, frequency characteristics of the acoustic routes, etc., and the low frequency sound and the high frequency sound may have a certain overlap (e.g., an aliasing portion) in the frequency band near a frequency-divided point. It should be understood that the overlap may not affect an overall sound leakage reduction effect of the open binaural earphone 1800.

The housing 1810 may be an external structure of the open binaural earphone 1800, and a shape of the housing 1810 may be determined according to a wearing type (e.g., ear-hook earphone, a headband earphone, etc.) and a usage requirement, which is not limited herein. For example, the housing 1810 may have a first part that matches the auricle of the user and may be hung on the ear of the user such that the open binaural earphone 1800 may not fall easily. As shown in FIG. 18, the first part may have the shape of an ear hook, and in such cases the open binaural earphone 1800 with the housing 1810 may be referred to as an ear-hook earphone. As another example, the first part of the housing 1810 may cross the user's head and immobilize on the head of the user in a manner similar to a headband. Two ends of the housing 1810 may have a distance from the user's ears. The open binaural earphone with the housing 1810 may be referred to as a headband open binaural earphone.

The housing 1810 may have a second part that includes a hollow structure. For brevity, the second part of the housing 1810 may be called a speaker housing, which may be similar to or same as the housing 10 describe elsewhere in the present disclosure. The microphone 1820, the acoustic driver(s) 1830, the guiding tube, the baffle 1850, the circuit board 1860, the Bluetooth module 1870, the power source module 1880, etc., may be disposed in the hollow structure. As shown in FIG. 18, the microphone 1820 and the acoustic driver(s) 1830 may be disposed at a front end of the housing 1810. The circuit board 1860 may be disposed in a middle portion of the housing 1810. The Bluetooth module 1870 and the power source module 1880 may be disposed at a rear end of the housing 1810. As used herein, the front end of the housing 1810 refers to an end of the housing 1810 close to an ear canal of a user when the user wears the open binaural earphone, the rear end of the housing 1810 refers to an end of the housing 1810 away from the ear canal of the user when the user wears the open binaural earphone, the middle portion of the housing 1810 refers to a portion of the housing between the front end of the housing 1810 and the rear end of the housing 1810. In some embodiments, the microphone 1820, the acoustic driver(s) 1830, the guiding tube, the baffle 1850, the circuit board 1860, the Bluetooth module 1870, and the power source module 1880 may be disposed in any other suitable positions of the housing 1810, which are not limited herein. For example, the acoustic driver 1830-1, the microphone 1820, the circuit board 1860, etc., may be disposed at the front end of the housing 1810, the Bluetooth module 1870 may be disposed in the middle portion of the housing 1810, and the acoustic driver 1830-2, the battery module 1880 may be disposed at the rear end of the housing 1810. As another example, the Bluetooth module 1870 and the power source module 1880 may be disposed at the front end of the housing 1810, the microphone 1820 and the circuit board 1860 may be disposed at the middle portion of the housing 1810, the acoustic driver 1830-1 and the acoustic driver 1830-2 may be disposed at the rear end of the housing 1810, and the sound guiding hole may be disposed at the front end of the housing 1810 through a guiding tube. It should be noted that the positions of the microphone 1820, the acoustic driver(s) 1830, the guiding tube, the baffle 1850, the circuit board 1860, the Bluetooth module 1870, and the power source module 1880 in the housing 1810 may be determined based on an actual requirement for the open binaural earphone 1800, and the specific positions of the components in the drawings are only for illustration purposes and do not limit the protection scope of the present disclosure. As shown in FIG. 20, the acoustic driver 1830-1 and the acoustic driver 1830-2 may be separated by the baffle 1850.

In some embodiments, the housing 1810 may be integrally formed. In some embodiments, the housing 1810 may be assembled via a plugging manner, a snapping manner, etc. In some embodiments, the housing 1810 may be made of a metal (e.g., copper, aluminum, titanium, gold, etc.), an alloy (e.g., aluminum alloy, a titanium alloy, etc.), a plastic (e.g., polyethylene, polypropylene, epoxy resin, nylon, etc.), a fiber (e.g., acetate fiber, propionate fiber, carbon fiber, etc.). In some embodiments, a protective cover may be disposed outside the housing 1810. The protective cover may be made of a soft material with certain elasticity, such as a soft silica gel, a rubber, etc., to provide a better touch sense for the user.

The surface of the housing 1810 may include one or more sound guiding holes, for example, the first sound guiding hole 1842-1, the second sound guiding hole 1842-2, the third sound guiding hole 1842-3, and the fourth sound guiding hole 1842-4. The open binaural earphone 1800 may transmit sound to the user through the air via the sound guiding holes. The acoustic driver(s) 1830 may convert the frequency-divided signals (e.g., an electrical signal) into a voice signal, transmit the voice signal to the sound guiding hole corresponding to the acoustic driver through the guiding tube corresponding to the sound guiding hole, and transmit the voice signal to the user through the sound guiding hole. To illustrate the effect of the sound guiding holes on the housing 1810 on the sound output by the open binaural earphone 1800, the sound guiding holes on the open binaural earphone 1800 may be regarded as sound sources for outputting sound (actually, the sound source may be still an acoustic output device) considering that the sound may be regarded as propagating from the sound guiding holes in the present disclosure. For the convenience of description and the purposes of illustration, when the sound guiding hole on the open binaural earphone 1800 has a relatively small size, each sound guiding hole may be regarded (or approximately regarded) as a point sound source.

The microphone 1820 may be configured to receive an external voice signal (e.g., a user's voice signal), and convert the received voice signal into an electrical signal. The voice signal received by the microphone 1820 may be processed to generate an audio signal (or frequency-divided signals). The process of the voice signal may include filtering, denoising, amplifying, smoothing and/or frequency division, or the like, or any combination thereof. The audio signal may be sent to an object or a device that is communicated with the open binaural earphone 1800 through other components (e.g., a Bluetooth assembly, a wireless fidelity (WIFI) assembly, etc.) of the open binaural earphone 1800.

The acoustic driver(s) 1830 may be configured to convert an input electrical signal into a voice signal and output the voice signal. The conversion technique may include a technique of vibrating and generating a sound. In some embodiments, the acoustic driver(s) 1830 may process the received audio signal into frequency-divided signals due to different frequency responses of the acoustic drive(s) 1830, convert the frequency-divided signals into voice signals with different frequency bands, and output the voice signals to the user who wears the open binaural earphone 1800. In some embodiments, the acoustic driver(s) 1830 may directly receive frequency-divided signals with different frequency bands, convert the received frequency-divided signals into voice signals, and output the voice signals to the user who wears the open binaural earphones 1800. In some embodiments, the acoustic driver(s) 1830 may include at least two loudspeaker units (or transducers). For example, only two loudspeaker units are shown in FIG. 18, FIG. 19, and FIG. 20 (i.e., a first loudspeaker unit 1830-1 and a second loudspeaker unit 1830-2). The first loudspeaker unit 1830-1 may correspond to a low-frequency signal, and the second loudspeaker unit 1830-2 may correspond to a high-frequency signal. In some embodiments, the acoustic driver(s) 1830 may include an air conductive loudspeaker, a bone conductive loudspeaker, a hydro-acoustic transducer, an ultrasonic transducer, or the like, or any combination thereof. In some embodiments, the acoustic driver(s) 1830 may include a moving coil loudspeaker, a moving iron loudspeaker, a piezoelectric loudspeaker, an electrostatic loudspeaker, a magnetostrictive loudspeaker, a balanced armature loudspeaker, or the like, or any combination thereof. In some embodiments, the loudspeaker units may have the same frequency response characteristic. In some embodiments, the loudspeaker units may have different frequency response characteristics.

It may be noted that a specific loudspeaker unit corresponding to a specific frequency-divided signal may indicate that a frequency band of the frequency-divided signal input to the specific loudspeaker unit may be the same as the frequency band of the specific frequency-divided signal, may indicate that the specific loudspeaker unit may generate the specific voice signal, or may indicate that the frequency band of the specific voice signal transmitted through the sound guiding hole after that the specific voice signal processed and transmitted by the specific loudspeaker unit may be the same as that of the specific frequency-divided signal.

Each loudspeaker unit may be configured to convert the input electrical signals (e.g., different frequency-divided signals) into voice signals using the technique of vibrating and generating the sound and output the voice signals. In some embodiments, each loudspeaker unit may correspond to two sound guiding holes. Each loudspeaker unit may output a set of voice signals with opposite phases and the same intensity, which may be respectively transmitted to the user through the guiding tube and the corresponding two sound guiding holes 1842. For example, the loudspeaker unit may include a vibration diaphragm, which may be driven by an electric signal to generate vibration, and a front side and a rear side of the vibration diaphragm may simultaneously output a positive phase sound and a reverse-phase sound. In some embodiments, by setting positions of the sound guiding holes, the positive phase sound and the reverse phase sound may have the same or similar phase at a hearing position and may be superimposed at the hearing position (i.e., the near-field such as a center position of an ear hole of a human ear). In addition, the positive phase sound and the reverse phase sound in the far-field may have different phases (e.g., a common leakage point in the surrounding environment) and may be canceled out in the far-field, thereby improving a volume of a sound in the near-field and reducing sound leakage in the far-field. In some embodiments, sound guiding holes corresponding to the same loudspeaker unit may be referred to as a dual-point sound source. For example, the first sound guiding hole 1842-1 and the second sound guiding hole 1842-2 corresponding to the loudspeaker unit 1830-1 may be referred to as a dual-point sound source, and/or the third sound guiding hole 1842-2 and the fourth sound guiding hole 1842-3 corresponding to the loudspeaker unit 1830-2 may be referred to as a dual-point sound source. In some embodiments, frequency bands and amplitudes of frequency-divided signals transmitted from sound guiding holes of the dual-point sound source may be the same, respectively, and phases thereof may be different (e.g., the phases may be opposite). In some embodiments, the frequency bands of the frequency-divided signals transmitted from the sound guiding holes in the dual-point sound source may be the same, and the phases may be the same. In some embodiments, a loudspeaker unit may correspond to one single sound guiding hole. That is, the loudspeaker unit may correspond to a single point sound source. In other words, the loudspeaker unit may output only one frequency-divided signal. For example, a side of the loudspeaker unit 1830-1 facing the sound guiding hole 1842-2 may be sealed. A dual-point sound source may be constructed by two loudspeaker units (i.e., two single point sound sources). For example, two balanced armature loudspeakers may be configured to construct a high-frequency dual-point sound source (i.e., the dual-point sound source corresponding to a high-frequency signal). In some embodiments, a frequency, a phase, an amplitude, and other parameters of the frequency-divided signal corresponding to each point sound source in each set of dual-point sound sources may be adjusted individually. For example, the frequency of each point sound source in each set of dual-point sound sources may be the same, and the phase may be the same or different. As another example, the frequency of each point sound source in each set of dual-point sound sources may be the same, and the amplitude may be the same or different.

In some embodiments, the higher the frequency band of the frequency-divided signal corresponding to the loudspeaker unit is, the shorter a distance between two sound guiding holes corresponding to the loudspeaker unit may be. For example, the first loudspeaker unit 1830-1 may be configured to output low-frequency signals, and the second loudspeaker unit 1830-2 may be configured to output high-frequency signals. A distance between the first sound guiding hole 1842-1 and the second sound guiding hole 1842-2 corresponding to the first loudspeaker unit 1830-1 may be greater than a distance between the third sound guiding hole 1842-3 and the fourth sound guiding hole 1842-4 corresponding to the second loudspeaker unit 1830-2. By setting the distance of the sound guiding holes corresponding to the loudspeaker units in this manner, the sound leakage of the open binaural earphone 1800 may be reduced. It may be because when the distance between the two point sound sources of the dual-point sound source is constant, the leakage sound generated by the dual-point sound source may be increased with the increment of the audio frequency, and the leakage reduction may be reduced with the increment of the audio frequency. When the audio frequency is greater than a certain value, the leakage sound of the dual-point sound source may be more than that of the single-point sound source, and the certain value may be an upper limit frequency at which the dual-point sound source may reduce the sound leakage. For different frequency-divided signals, by setting a plurality of sets of dual-point sound sources the point sound sources in each of which may be with different distances, a stronger leakage reduction ability than that of the single-point sound source may be obtained. For example, the audio signal may be divided into three frequency bands such as a low frequency band, a medium frequency band, and a high frequency band. A low-frequency dual-point sound source, a mid-frequency dual-point sound source, and a high-frequency dual-point sound source may be generated by setting different distances between two point sound sources of each of the dual-point sound sources. The low-frequency dual-point sound source may have a relatively large distance than the high-frequency dual-point sound source and mid-frequency dual-point sound source, the mid-frequency dual-point sound source may have a middle distance between the low-frequency dual-point sound source and high-frequency dual-point sound source, and the high-frequency dual-point sound source may have a relatively small distance than the low-frequency dual-point sound source and mid-frequency dual-point sound source. In the low-frequency band, due to the increment of the volume of the sound is greater than the increment of the volume of the leakage sound when the distance between the sound sources is enlarged, a sound with a relatively high volume may be output in the low-frequency band. Due to the sound leakage of the dual-point sound source in the low-frequency band is relatively small, when the distance between the sound sources is enlarged, the sound leakage may be slightly increased and kept at a relatively low level. In the high-frequency band, a relatively low upper limit frequency of high-frequency leakage reduction may be improved and a relatively narrow audio frequency range of the leakage reduction may be enlarged by decreasing the distance between the sound sources. The open binaural earphone 1800 may have a relatively strong sound leakage reduction effect in higher-frequency bands, which may satisfy the requirements of open binaural.

In some embodiments, the acoustic driver(s) 1830 may include the first loudspeaker unit 1830-1 and the second loudspeaker unit 1830-2, the first loudspeaker unit 1830-1 may correspond to a low-frequency signal, and the second loudspeaker unit 1830-2 may correspond to a high-frequency signal. In some embodiments, the frequency division point between the low frequency and the high frequency may be between 600 Hz and 1.2 kHz. In some embodiments, the first loudspeaker unit 1830-1 may correspond to the sound guiding hole 1842-1 and the sound guiding hole 1842-2, and the second loudspeaker unit 1830-2 may correspond to the sound guiding hole 1842-3 and the sound guiding hole 1842-4. A distance $d_l$ between the sound guiding hole 1842-1 and the sound guiding hole 1842-2 and the distance $d_h$ between the sound guiding hole 1842-3 and the sound guiding hole 1842-4 may be various. Merely by way of example, $d_l$ may be not larger than 40 millimeters, for example, in the range of 20 millimeters-40 millimeters, and $d_h$ may be not larger than 12 millimeters and $d_l$ is larger than $d_h$. In some embodiments, $d_l$ may be not less than 12 millimeters, and $d_h$ may be not greater than 7 millimeters, for example, in the range of 3 millimeters-7 millimeters. In some embodiments, $d_l$ may be 30 millimeters, and $d_h$ may be 5 millimeters. As another example, $d_l$ may be at least twice of $d_h$. In some embodiments, $d_l$ may be at least 3 times of $d_h$. In some embodiments, $d_l$ may be at least 5 times of $d_h$. In some embodiments, a range of $$\frac{d_l}{d_h}$$

may be 2-10. In some embodiments, the range $$\frac{d_l}{d_h}$$

may be 2.5-9.5. In some embodiments, the range of $$\frac{d_l}{d_h}$$

may be 3-9. In some embodiments, the range of $$\frac{d_l}{d_h}$$

may be 3.5-8.5. In some embodiments, the range of $$\frac{d_l}{d_h}$$

may be 4-8. In some embodiments, the range of $$\frac{d_l}{d_h}$$

may be 4.5-7.5. In some embodiments, the range of $$\frac{d_l}{d_h}$$

may be 5-7. In some embodiments, the range of $$\frac{d_l}{d_h}$$

may be 5.5-6.5. In some embodiments, the range of $$\frac{d_l}{d_h}$$

may be 6.

Figure 21:
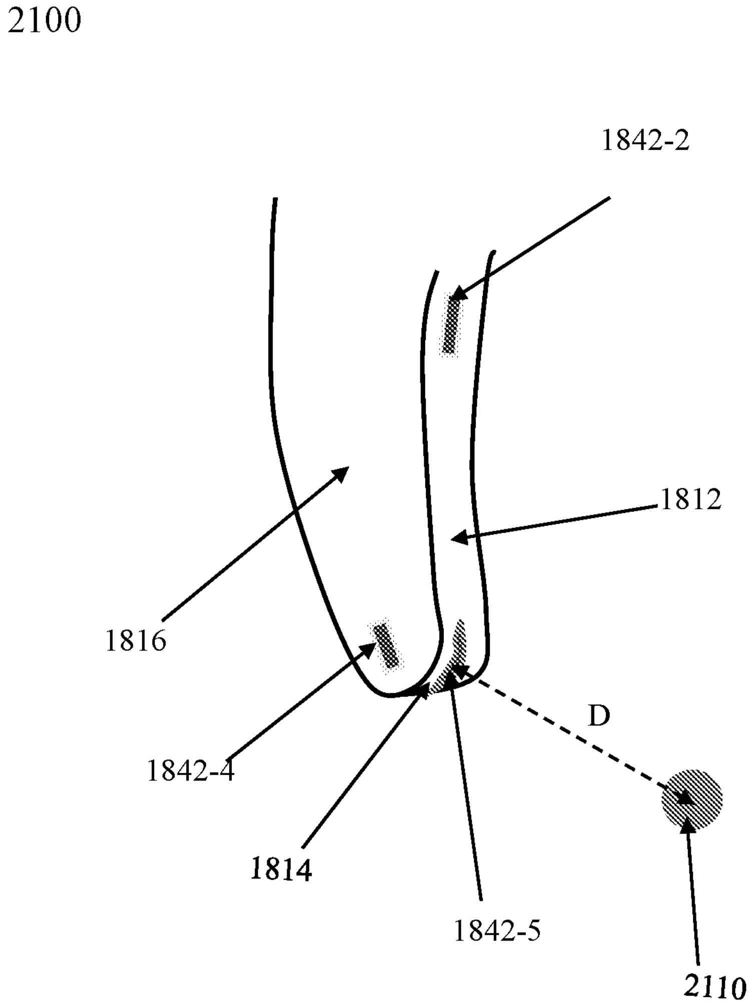
FIG. 21 is a schematic diagram illustrating exemplary positions of sound guiding holes according to some embodiments of the present disclosure.

In some embodiments, each set of dual-point sound sources may include a near-ear point sound source and a far-ear point sound source. For example, when the user wears the open binaural earphones 1800, the first sound guiding hole 1842-1 may be closer to the ear hole than the second sound guiding hole 1842-2, and the third sound guiding hole 1842-3 may be closer to the ear hole than the fourth sound guiding hole 1842-4, and accordingly, the first sound guiding hole 1842-1 and the third sound guiding hole 1842-3 may be referred to as the near-ear point sound sources, the second sound guiding hole 1842-2 and the fourth sound guiding hole 1842-4 may be referred to as the far-ear point sound sources. In some embodiments, a distance L between the first sound guiding hole 1842-1 and the third sound guiding hole 1842-3 may be not greater than 20 millimeters. In some embodiments, the distance L may be not greater than 18 millimeters. In some embodiments, the distance L may be not greater than 16 millimeters. In some embodiments, the distance L may be not greater than 14 millimeters. In some embodiments, the distance L may be not greater than 12 millimeters. In some embodiments, the distance L may not greater than 10 millimeters. In some embodiments, the distance L may be not greater than 9 millimeters. In some embodiments, the distance L may be not greater than 8 millimeters. In some embodiments, the distance L may be not greater than 7 millimeters. In some embodiments, the distance L may be not greater than 6 millimeters. In some embodiments, the distance L may be not greater than 5 millimeters. In some embodiments, the distance L may be not greater than 4 millimeters. In some embodiments, the distance L may be not greater than 3. mm. In some embodiments, the distance L may be not greater than 2 millimeters. In some embodiments, the distance L may be not greater than 1 millimeter. In some embodiments, the distance L may be equal to zero. When the distance L is equal to 0, the near-ear point sound sources in each set of dual-point sound sources may be combined into one sound guiding hole and configured as a main sound guiding hole to transmit sound to the ear hole of the user. For example, the first sound guiding hole 1842-1 and the third sound guiding hole 1842-3 may be combined into one sound guiding hole (e.g., a sound guiding hole 1842-5 in FIG. 21). In some embodiments, at least a portion of at least one sound guiding hole may face the user's ear. In this case, the sound from the sound guiding hole may be transmitted to the user's ear hole (as shown in FIG. 21).

In some embodiments, a shape of the sound guiding hole may include a strip-shape, a circle, an ellipse, a square, a trapezoid, a rounded quadrilateral, a triangle, an irregular shape, or the like, or any combination thereof. In some embodiments, the shapes of the sound guiding holes may be the same or different. For example, a shape of the first sound guiding hole 1842-1 and a shape of the third sound guiding hole 1842-3 may be circular, and a shape of the second sound guiding hole 1842-2 and a shape of the fourth sound guiding hole 1842-4 may be oval. As another example, the shape of the first sound guiding hole 1842-1 may be strip-shaped, the shape of the second sound guiding hole 1842-2 may be an oval, the shape of the third sound guiding hole 1842-3 may be a circle, and the shape of the fourth sound guiding holes 1842-4 may be triangular. As yet another example, the shapes of the first sound guiding hole 1842-1, the second sound guiding hole 1842-2, the third sound guiding hole 1842-3, and the fourth sound guiding hole 1842-4 may be all strip-shaped.

In some embodiments, apertures or sizes of sound guiding holes corresponding to different loudspeaker units may be the same or different. In some embodiments, when the sizes of the sound guiding holes are different, the volumes of the corresponding sound and/or leakage sound may be different. In some embodiments, by setting a near-to-far aperture ratio (i.e., the ratio of the aperture of a sound guiding hole near an ear, i.e., a near-ear point sound source to the aperture of a sound guiding hole far away the ear, i.e., far-ear point sound source), the dual-point sound source may obtain relatively strong leakage reduction capability. In some embodiments, the higher a frequency band of a frequency-divided signal corresponding to a dual-point sound source is, the smaller the near-to-far aperture ratio may be. As the frequency band of the frequency-divided signal corresponding to the dual-point sound source becomes higher, the aperture of the near-ear point sound source and the aperture of the far-ear point sound source may gradually become the same. For example, for the dual-point sound source corresponding to low-frequency signals, the aperture of the near-ear point sound source may be greater than the aperture of the far-ear point sound source. For the dual-point sound source corresponding to high-frequency signals, the aperture of the near-ear point sound source may be the same as or similar to that of the far-ear point sound source.

In some embodiments, the near-to-far aperture ratio of the dual-point sound source corresponding to the low-frequency signals may be not less than 1. In some embodiments, the near-to-far aperture ratio of the dual-point sound source corresponding to the low-frequency signals may be not less than 5. In some embodiments, the near-to-far aperture ratio may be not less than 10. In some embodiments, the near-to-far aperture ratio of the dual-point sound source corresponding to the low-frequency signals may be not less than 15. In some embodiments, the near-to-far aperture ratio of the dual-point sound source corresponding to the low-frequency signals may be not less than 20. In some embodiments, the near-to-far aperture ratio of the dual-point sound source corresponding to the low-frequency signals may be not less than 25. In some embodiments, the near-to-far aperture ratio of the dual-point sound source corresponding to the low-frequency signals may be not less than 30.

In some embodiments, the near-to-far aperture ratio of a dual-point sound source corresponding to the high-frequency signals may be not greater than 10. In some embodiments, the near-to-far aperture ratio of the dual-point sound source corresponding to the high-frequency signals may be not greater than 8. In some embodiments, the near-to-far aperture ratio of the dual-point sound source corresponding to the high-frequency signals may be not greater than 6. In some embodiments, the near-to-far aperture ratio of the dual-point sound source corresponding to the high-frequency signals may be not greater than 4. In some embodiments, the near-to-far aperture ratio of the dual-point sound source corresponding to the high-frequency signals may be not greater than 3. In some embodiments, the near-to-far aperture ratio of the dual-point sound source corresponding to the high-frequency signals may be not greater than 2. In some embodiments, the near-to-far aperture ratio of the dual-point sound source corresponding to the high-frequency signals may be equal to 1.

In some embodiments, by adjusting the positions of different sound guiding holes, the user may obtain different listening effects. More descriptions regarding the positions of the sound guiding holes and a hearing position may be found elsewhere in the present disclosure. In some embodiments, when the user wears the open binaural earphone 1800, a distance $D_n$, between a center point of the near-ear point sound source of each set of dual-point sound source and a center point of the user's ear hole may be no more than 10 centimeters, thereby improving the user's listening experience. In some embodiments, the distance $D_n$ may be no more than 9 centimeters. In some embodiments, the distance $D_n$ may be no more than 8 centimeters. In some embodiments, the distance $D_n$ may be no more than 7 centimeters. In some embodiments, the distance $D_n$ may be no more than 6 centimeters. In some embodiments, the distance D 7, may be no more than 5 centimeters. In some embodiments, the distance $D_n$ may be no more than 4 centimeters. In some embodiments, the distance $D_n$ may be no more than 3 centimeters. In some embodiments, the distance $D_n$ may be no more than 2.5 centimeters. In some embodiments, the distance D 7, may be no more than 2 centimeters. In some embodiments, the distance $D_n$ may be no more than 1.5 centimeters. In some embodiments, the distance $D_n$ may be no more than 1 centimeters. In some embodiments, the distance $D_n$ may be no more than 0.5 centimeters. In some embodiments, the distance $D_n$ may be no more than 0.4 centimeters. In some embodiments, the distance $D_n$ may be no more than 0.3 centimeters. In some embodiments, the distance $D_n$ may be no more than 0.2 centimeters. In some embodiments, the distance $D_n$ may be no more than 0.1 centimeters.

In some embodiments, the open binaural earphone 1800 may include a low-frequency loudspeaker unit and a high-frequency loudspeaker unit, and the near-ear sound guiding hole corresponding to the low-frequency loudspeaker unit may be combined with the near-ear sound guiding hole corresponding to the high-frequency loudspeaker unit into one single sound guiding hole. For example, as shown in FIG. 21, the first sound guiding hole 1842-1 and the third sound guiding hole 1842-3 may be combined into the sound guiding hole 1842-5. In some embodiments, one end of the sound guiding hole 1842-5 may be disposed on an end surface 1812, and the other end of the sound guiding hole 1842-5 may be disposed on an end surface 1814. When the user wears the open binaural earphones 1800, the first sound guiding hole 1842-1 and the third sound guiding hole 1842-3 (i.e., near-ear point sound sources) may face the user's ear hole, and the user may hear the sound (i.e., hearing sound) with a relatively high volume. In some embodiments, the second sound guiding hole 1842-2 may be disposed on the end surface 1812. The fourth sound guiding hole 1842-4 may be disposed on an end surface 1816. In some embodiments, the first sound guiding hole 1842-1, the second sound guiding hole 1842-2, the third sound guiding hole 1842-3, and the fourth sound guiding hole 1842-4 may all be disposed on the end surface 1812 (or the end surface 1816). In some embodiments, the third sound guiding hole 1842-3 may be disposed on the end surface 1812 and the fourth sound guiding hole 1842-4 may be disposed on a surface opposite to the end surface 1812. In some embodiments, as shown in FIG. 18, the first sound guiding hole 1842-1 and the second sound guiding hole 1842-2 may be disposed at any position of the front end of the housing 1810 (e.g., the end face 1812, the end face 1814, the end face 1816, etc.), the third sound guiding hole 1842-3 and the fourth sound guiding hole 1842-4 may be disposed at any position of the rear end of the housing 1810. In some embodiments, the first sound guiding hole 1842-1 and the third sound guiding hole 1842-3 may be disposed at the front end of the housing 1810, and the second sound guiding hole 1842-2 and the fourth sound guiding hole 1842-4 may be disposed at the rear end of the housing 1810. In some embodiments, when the user wears the open binaural earphone 1800, a distance D between a center point of the sound guiding hole 1842-5 and a center point of the ear hole (e.g., the ear hole 2110 as shown in FIG. 21) close to the center point of the sound guiding hole 1842-5 may be not greater than 10 centimeters. In some embodiments, the distance D may be not greater than 9 centimeters. In some embodiments, the distance D may be not greater than 8 centimeters. In some embodiments, the distance D may be not greater than 7 centimeters. In some embodiments, the distance D may be not greater than 6 centimeters. In some embodiments, the distance D may be not greater than 5 centimeters. In some embodiments, the distance D may be not greater than 4 centimeters. In some embodiments, the distance D may be not greater than 3 centimeters. In some embodiments, the distance D may be not greater than 2.5 centimeters. In some embodiments, the distance D may be not greater than 2 centimeters. In some embodiments, the distance D may be not greater than 1.5 centimeters. In some embodiments, the distance D may be not greater than 1 centimeters. In some embodiments, the distance D may be not greater than 0.5 centimeters. In some embodiments, the distance D may be not greater than 0.4 centimeters. In some embodiments, the distance D may be not greater than 0.3 centimeters. In some embodiments, the distance D may be not greater than 0.2 centimeters. In some embodiments, the distance D may be not greater than 0.1 centimeters.

In some embodiments, a baffle may be disposed between two point sound sources of a dual-point sound source, and the volume of the near-field sound may be significantly increased under the condition that the volume of the far-field sound leakage is not increased significantly, thereby improving the user's listening experience. More descriptions regarding the baffle between the two point sound sources of a dual-point sound source may be found elsewhere in the present disclosure. In some embodiments, a low-frequency dual-point sound source may include a sound guiding hole disposed at a near-ear point (i.e., a near-ear sound guiding hole or near-ear point sound source), and a sound guiding hole at a far-ear point may be disposed at a rear end of the housing 1810 (i.e., a far-ear sound guiding hole or far-ear point sound source). When the user wears the open binaural earphone 1800, the near-ear point sound source and the far-ear point sound source may be separated by the user's auricle. On this occasion, the auricle may act as a baffle, thereby significantly increasing the volume of the near-field sound, and improving the user's listening experience.

In some embodiments, internal friction or viscous force of a medium in the guiding tube may affect sound propagation, and a diameter of the guiding tube may be not too small, otherwise, it may cause sound loss and reduce output volume. However, when the diameter of a guiding tube is too great, when the transmitted sound is greater than a certain frequency, high-order waves may be generated in the guiding tube. To avoid the generation of the high-order waves, the diameter of the guiding tube may be determined reasonably. In some embodiments, the radius of the guiding tube may be 0.5 millimeters-10 millimeters. In some embodiments, the radius of the guiding tube may be 0.5 millimeters-9 millimeters. In some embodiments, the radius of the guiding tube may be 0.7 millimeters-8 millimeters. In some embodiments, the radius of the guiding tube may be 0.9 millimeters-7.5 millimeters. In some embodiments, the radius of the guiding tube may be 1 millimeters-7 millimeters. In some embodiments, the radius of the guiding tube may be 1.5 millimeters-6.5 millimeters. In some embodiments, the radius of the guiding tube may be 1.75 millimeters-5 millimeters. In some embodiments, the radius of the guiding tube may be 1.75 millimeters-6 millimeters. In some embodiments, the radius of the guiding tube may be 2 millimeters-6 millimeters. In some embodiments, the radius of the guiding tube may be 2.5 millimeters-5.5 millimeters. In some embodiments, the radius of the guiding tube may be 3 millimeters-5 millimeters. In some embodiments, the radius of the guiding tube may be 3.5 millimeters-4.5 millimeters. In some embodiments, the radius of the guiding tube may be 3.7 millimeters-4.2 millimeters.

In some embodiments, a radiation impedance of a guiding tube and a radiation impedance of a nozzle (also referred to as a sound guiding hole) may interact with each other, which may cause a sound with a specific frequency to form a standing wave in the guiding tube, and one or more peaks/valleys may be formed at one or more frequencies of an output sound, thereby affecting the quality of the output sound. Generally, the longer a length of the guiding tube is, the lower the frequency of forming the one or more peaks/valleys is, and the greater the count of the one or more peaks/valleys may be. In some embodiments, the length of the guiding tube may be not greater than 300 millimeters. In some embodiments, the length of the guiding tube may be not greater than 250 millimeters. In some embodiments, the length of the guiding tube may be not greater than 200 millimeters. In some embodiments, the length of the guiding tube may be not greater than 150 millimeters. In some embodiments, the length of the guiding tube may be not greater than 100 millimeters. In some embodiments, the length of the guiding tube may be not greater than 50 millimeters. In some embodiments, the length of the guiding tube may be not greater than 30 millimeters. In some embodiments, the length of the guiding tube may be not greater than 20 millimeters. In some embodiments, the length of the guiding tube may be not greater than 10 millimeters. In some embodiments, an impedance matching layer may be disposed at the sound guiding hole to reduce the effect of the one or more peaks/valleys. In some embodiments, a length-to-diameter ratio (i.e., a ratio of the length to the diameter) of the guiding tube may affect the sound generated in the guiding tube. The effect of the length-to-diameter may be the same as or similar to the effect of low-pass filtering and the effect of damping, which may attenuate the volume, and the attenuation of a volume of a high-frequency sound may be greater than the attenuation of a volume of a low-frequency sound. To avoid that the attenuation affects a hearing sound, in some embodiments, the length to diameter ratio of the guiding tube may be not greater than 200. In some embodiments, the length to diameter ratio of the guiding tube may be not greater than 180. In some embodiments, the length to diameter ratio of the guiding tube may be not greater than 160. In some embodiments, the length to diameter ratio of the guiding tube may be not greater than 150. In some embodiments, the length to diameter ratio of the guiding tube may be not greater than 130. In some embodiments, the length to diameter ratio of the guiding tube may be not greater than 110. In some embodiments, the length to diameter ratio of the guiding tube may be not greater than 80. In some embodiments, the length to diameter ratio of the guiding tube may be not greater than 50. In some embodiments, the length to diameter ratio of the guiding tube may be not greater than 30. In some embodiments, the length to diameter ratio of the guiding tube may be not greater than 10.

In some embodiments, parameters (e.g., a length, a radius, a length-to-diameter ratio, etc.) of each guiding tube may be the same or different. For example, a length of the first guiding tube 1840-1 may be 5 millimeters, and a length of the second guiding tube 1840-2 may be 30 millimeters. As another example, the lengths of the first guiding tube 1840-1 and the third guiding tube 1840-3 may both be 5 millimeters.

In some embodiments, the phases of frequency-divided signals corresponding to point sound sources may be different, and the volumes of the hearing sound and the leakage sound may be different. Therefore, different output effects may be achieved by adjusting the phases of the point sound sources. In some embodiments, to reduce the far-field leakage sound of the open binaural earphone 1800, the acoustic driver 1830-1 may generate low-frequency sounds with the same (or substantially the same) amplitude and opposite (or substantially opposite) phases at the first sound guiding hole 1842-1 and the second sound guiding hole 1842-2, respectively, and the acoustic driver 1830-2 may generate high-frequency sounds with the same (or substantially the same) amplitude and opposite (or substantially opposite) phases at the first sound guiding hole 1842-3 and the second sound guiding hole 1842-4, respectively. In some embodiments, the higher the frequency bands of the frequency-divided signals corresponding to the dual-point sound source is, the greater a phase difference between the frequency-divided signals may be. For example, in the dual-point sound source including two loudspeaker units, for a dual-point sound source corresponding to low-frequency signals, the phase difference between the low-frequency signals transmitted from the dual-point sound source may be adjusted to be equal (or substantially equal) to 0°. For a dual-point sound source corresponding to high-frequency signals, the phase difference between the high-frequency signals transmitted from the dual-point sound source may be adjusted to be equal (or substantially equal) to 180°. In some embodiments, the phase of the dual-point sound source may be adjusted, and the phase difference of sounds generated by the dual-point sound source at the near-field position (or a center point of the ear hole) may be equal (or substantially equal) to 0°, and the phase difference between the sound at the far-field position may be equal (or substantially equal) to 180°. In some embodiments, a phase difference of sounds output by two point sound sources of the dual-point sound source may be equal to 5°, 10°, 20°, 50°, 70°, 90°, 100°, 120°, 130°, 150°, 170°, 175°, 180°, or the like, or any combination thereof.

The circuit board 1860 may be configured to integrate one or more components to realize various functions. For example, a frequency division processing unit may be integrated into the circuit board to realize the frequency division function on audio signals. As another example, a signal processing unit may be integrated into the circuit board to adjust the phases and/or amplitudes of the audio signals. The Bluetooth module 1870 may be configured to communicate the open binaural earphone 1800 with an external device. For example, the open binaural earphone 1800 may be communicated with an external audio device through Bluetooth module 1870. In some embodiments, the Bluetooth module 1870 may be integrated on the circuit board 1860. The power source module 1880 may be configured to provide power to the one or more components of the open binaural earphone 1800. In some embodiments, the power source module 1880 may include an accumulator, a dry battery, a lithium battery, a Daniell battery, a fuel battery, or the like. Other components such as the circuit board 1860, the Bluetooth unit 1870, and the power source module 1880 of the open binaural earphone 1800 may be referred to the settings of general earphones in the prior art, which are not repeated herein.

It should be noted that the descriptions of the open binaural earphone 1800 may be intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the open binaural earphone 1800 may include one or more additional components, and one or more components of the open binaural earphone 1800 described above may be omitted. Merely by way of example, a feedback microphone may be added to the open binaural earphone 1800. The feedback microphone may be configured to reduce a residual noise (e.g., a circuit current noise). As another example, the baffle 1850 may be omitted. As yet another example, one or more buttons (e.g., a volume increase button, a volume decrease button, a power button, a Bluetooth switch button, etc.) may be disposed on the housing 1810. As yet another example, the open binaural earphone 1800 may be connected with a user terminal through the Bluetooth module 1870. The user terminal may display a control interface, and the user may issue a control instruction through the control interface, for example, increasing or decreasing the volume, etc. The control signal may be received by the Bluetooth module 1870 and realize the control of the open binaural earphone 1800. In some embodiments, the Bluetooth module 1870 may be omitted. The open binaural earphone 1800 may communicate with an external device through a data cable.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A speaker, comprising:

an ear hook, the ear hook matches a user's auricle and is hung on the user's ear such that the speaker can be arranged around or partially around the user's ear while keeping the user's ear open;

a speaker housing;

a transducer residing inside the speaker housing and configured to generate vibrations, the vibrations producing a sound wave inside the housing; and at least two sound guiding holes located on the speaker housing and configured to guide the sound wave inside the housing through the at least two sound guiding holes to an outside of the speaker housing, wherein the at least two sound guiding holes include a first sound guiding hole and a second sound guiding hole, the first sound guiding hole and the second sound guiding hole are located on different side walls of the speaker housing, and the guided sound waves of the first sound guiding hole and the second sound guiding hole have different phases, the speaker housing includes a specific side wall where no sound guiding hole is located, and a distance from the first sound guiding hole to the specific side wall of the speaker housing is different from a distance from the second sound guiding hole to the specific side wall of the speaker housing.

2. The speaker of claim 1, wherein the speaker housing includes a bottom or a sidewall; and the at least two sound guiding hole are located on the bottom or the sidewall of the speaker housing.

3. The speaker of claim 1, wherein locations of the at least two sound guiding holes are determined based on at least one of: a vibration frequency of the transducer, shapes of the at least two sound guiding holes, or a count of the at least two sound guiding holes.

4. The speaker of claim 1, wherein the first sound guiding hole or the second sound guiding hole includes a damping layer, the damping layer being configured to adjust the phase of the guided sound wave of the first sound guiding hole or the second sound guiding hole.

5. The speaker of claim 4, wherein the damping layer includes at least one of: a tuning paper, a tuning cotton, a nonwoven fabric, a silk, a cotton, a sponge, or a rubber.

6. The speaker of claim 1, wherein a shape of at least one sound guiding hole of the at least two sound guiding holes includes circle, ellipse, quadrangle, rectangle, or linear.

7. The speaker of claim 1, wherein the speaker further includes:

at least one acoustic route coupled to at least one sound guiding hole of the at least two sound guiding holes, wherein a guided sound wave of the at least one sound guiding hole is propagated to the at least one sound guiding hole along the acoustic route, and the at least one acoustic route is configured to adjust a frequency of the guided sound wave.

8. The speaker of claim 7, wherein the acoustic route is configured to adjust a frequency of the guided sound wave by filtering sound waves in target frequencies.

9. The speaker of claim 7, wherein the acoustic route includes one or more lumen structures.

10. The speaker of claim 7, wherein the acoustic route includes one or more resonance cavities.

11. The speaker of claim 1, wherein:

the first sound guiding hole is closer to the user's ear canal than the second sound guiding hole, and a distance between the first sound guiding hole and the second sound guiding hole is not greater than 12 mm.

12. The speaker of claim 11, wherein when the user wears the speaker, a distance between a center point of the first sound guiding hole and a center point of the user's ear canal is no more than 1 cm.

13. The speaker of claim 11, wherein:

a first aperture of the first sound guiding hole is greater than a second aperture of the second sound guiding hole.

14. The speaker of claim 13, wherein an aperture ratio of the first aperture of the first sound guiding hole to the second aperture of the second sound guiding hole is not less than 1.

15. The speaker of claim 13, wherein an aperture ratio of the first aperture of the first sound guiding hole to the second aperture of the second sound guiding hole is not less than 5.

16. The speaker of claim 13, wherein an aperture ratio of the first aperture of the first sound guiding hole to the second aperture of the second sound guiding hole is not less than 10.

17. The speaker of claim 1, further comprising:

a first guiding tube corresponding to the first sound guiding hole; and a second guiding tube corresponding to the second sound guiding hole, wherein a radius of the first guiding tube or a radius of the second guiding tube is within a range of 1.75 mm-5 mm.

18. The speaker of claim 17, wherein a length of the first guiding tube or a length of the second guiding tube is not greater than 10 mm.

19. The speaker of claim 17, wherein a ratio of a length of the first guiding tube to a diameter of the first guiding tube is not greater than 200, or a ratio of a length of the second guiding tube to a diameter of the second guiding tube is not greater than 200.

20. The speaker of claim 1, wherein the guided sound waves of the first sound guiding hole and the second sound guiding hole interfere with each other to reduce a sound pressure level of a leaked sound wave of the speaker.

* * * * *